(12) United States Patent
Depauw

(10) Patent No.: US 9,876,465 B2
(45) Date of Patent: Jan. 23, 2018

(54) ASSEMBLY COMPRISING PROFILES FOR SUPPORTING A SOLAR PANEL

(71) Applicant: VOESTALPINE SADEF NV, Hooglede (BE)

(72) Inventor: Marc Depauw, Kortemark (BE)

(73) Assignee: VOESTALPINE SADEF NV, Hooglede (BE)

( * ) Notice: Subject to any disclaimer, the term of this patent is extended or adjusted under 35 U.S.C. 154(b) by 0 days.

(21) Appl. No.: 15/128,031

(22) PCT Filed: Mar. 20, 2015

(86) PCT No.: PCT/EP2015/056004
§ 371 (c)(1),
(2) Date: Sep. 21, 2016

(87) PCT Pub. No.: WO2015/144601
PCT Pub. Date: Oct. 1, 2015

(65) Prior Publication Data
US 2017/0104445 A1    Apr. 13, 2017

(30) Foreign Application Priority Data

Mar. 24, 2014 (EP) .................................. 14161341

(51) Int. Cl.
*F24J 2/52* (2006.01)
*H02S 30/10* (2014.01)
*F16B 5/06* (2006.01)

(52) U.S. Cl.
CPC ............ *H02S 30/10* (2014.12); *F16B 5/0685* (2013.01); *F24J 2/5207* (2013.01); *F24J 2/5232* (2013.01)

(58) Field of Classification Search
CPC ......... F24J 2/5207; H02S 30/10; H02S 30/00; H02S 20/00; E04F 13/26; E04F 13/074; E04F 13/07; F16B 15/0685
See application file for complete search history.

(56) References Cited

U.S. PATENT DOCUMENTS 4,263,896 A * 4/1981 Zebuhr .................... F24J 2/045
126/623
4,353,192 A * 10/1982 Pearson ................. E04B 1/943
52/281

(Continued)

FOREIGN PATENT DOCUMENTS

DE    102010046376 A1    3/2012
DE    202012005504 U1    6/2012

(Continued)

OTHER PUBLICATIONS

Extended European Search Report for corresponding European Application No. 14161341.4, dated Aug. 5, 2014.

(Continued)

*Primary Examiner* — Beth A Stephan
(74) *Attorney, Agent, or Firm* — Justin Cassell; Workman Nydegger

(57) ABSTRACT

An assembly comprises at least two structural profiles arranged parallel to each other with respect to their length direction and at least one solar panel. Each of the structural profiles is doubled walled and comprises a continuous top cover and a plurality of spaced panel support sections. Each of said plurality of structural profiles is positioned such that, in between the respective top covers and their corresponding panel supports of adjacent structural profiles, along the length direction, the at least one solar panel can be slidably mounted at both its opposing edges.

14 Claims, 24 Drawing Sheets

(56) References Cited

U.S. PATENT DOCUMENTS

| | | | | |
|---|---|---|---|---|
| 8,739,483 B1* | 6/2014 | Bilge | .................. | E04F 13/0805 |
| | | | | 52/235 |
| 8,925,271 B1* | 1/2015 | Bilge | ........................ | E04B 1/40 |
| | | | | 52/506.05 |
| 9,512,617 B2* | 12/2016 | Powers, III | ............. | E04B 7/024 |
| 2006/0086382 A1 | 4/2006 | Plaisted | | |
| 2006/0118163 A1* | 6/2006 | Plaisted | ................. | F24J 2/5207 |
| | | | | 136/251 |
| 2008/0053517 A1* | 3/2008 | Plaisted | ................. | F24J 2/5207 |
| | | | | 136/251 |
| 2011/0070765 A1 | 3/2011 | Kobayashi | | |
| 2012/0073219 A1* | 3/2012 | Zuritis | ................... | F24J 2/5207 |
| | | | | 52/173.3 |
| 2012/0328898 A1* | 12/2012 | Strickland | .............. | B62D 21/02 |
| | | | | 428/594 |
| 2013/0136531 A1* | 5/2013 | Kobayashi | ............. | F24J 2/5207 |
| | | | | 403/326 |
| 2013/0299656 A1* | 11/2013 | Kemmer | ................ | F24J 2/5245 |
| | | | | 248/231.85 |
| 2013/0340810 A1* | 12/2013 | Danning | ................. | H02S 20/23 |
| | | | | 136/251 |
| 2014/0020308 A1 | 1/2014 | Heisler | | |
| 2016/0164455 A1* | 6/2016 | Kanbara | ................. | H02S 20/23 |
| | | | | 136/251 |

FOREIGN PATENT DOCUMENTS

| | | |
|---|---|---|
| DE | 202012008175 U1 | 12/2012 |
| EP | 2413381 A2 | 2/2012 |
| EP | 2495508 A2 | 9/2012 |
| EP | 2562488 A1 | 2/2013 |
| FR | 2954791 A1 | 7/2011 |
| FR | 2968740 A1 | 6/2012 |
| WO | 2010054617 A2 | 5/2010 |

OTHER PUBLICATIONS

International Search Report for corresponding International PCT Application No. PCT/EP2015/056004, dated Jun. 8, 2015.

* cited by examiner

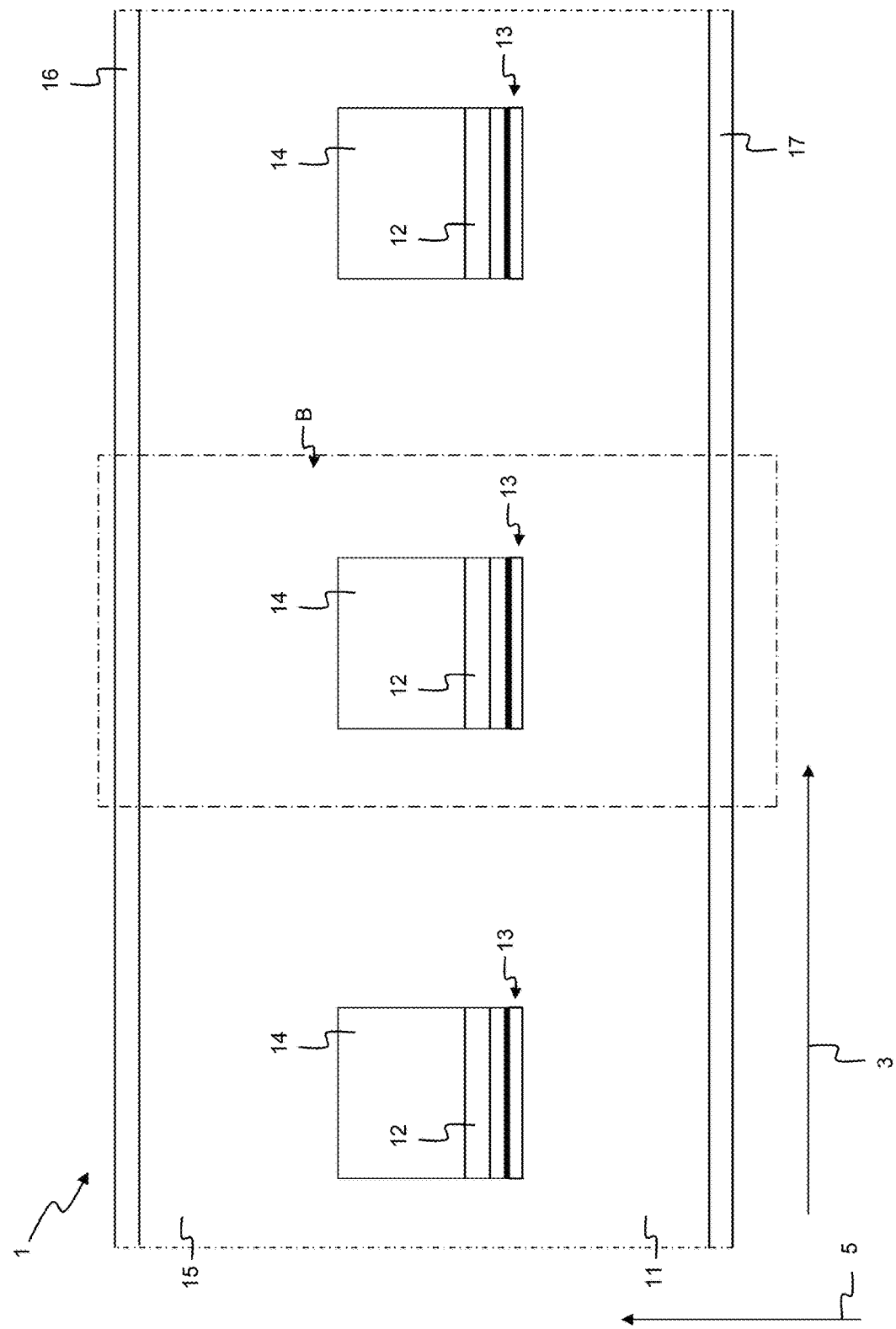

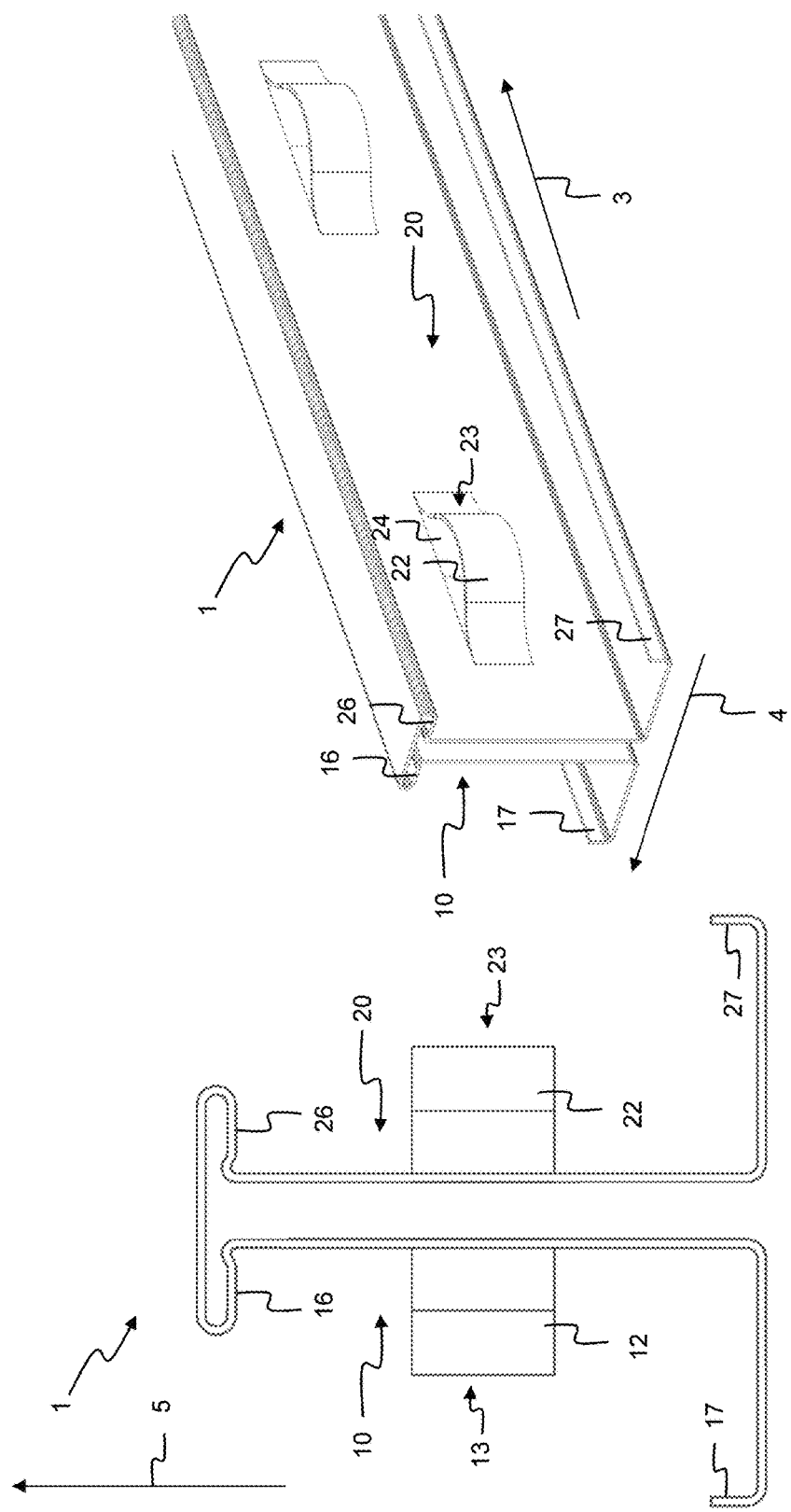

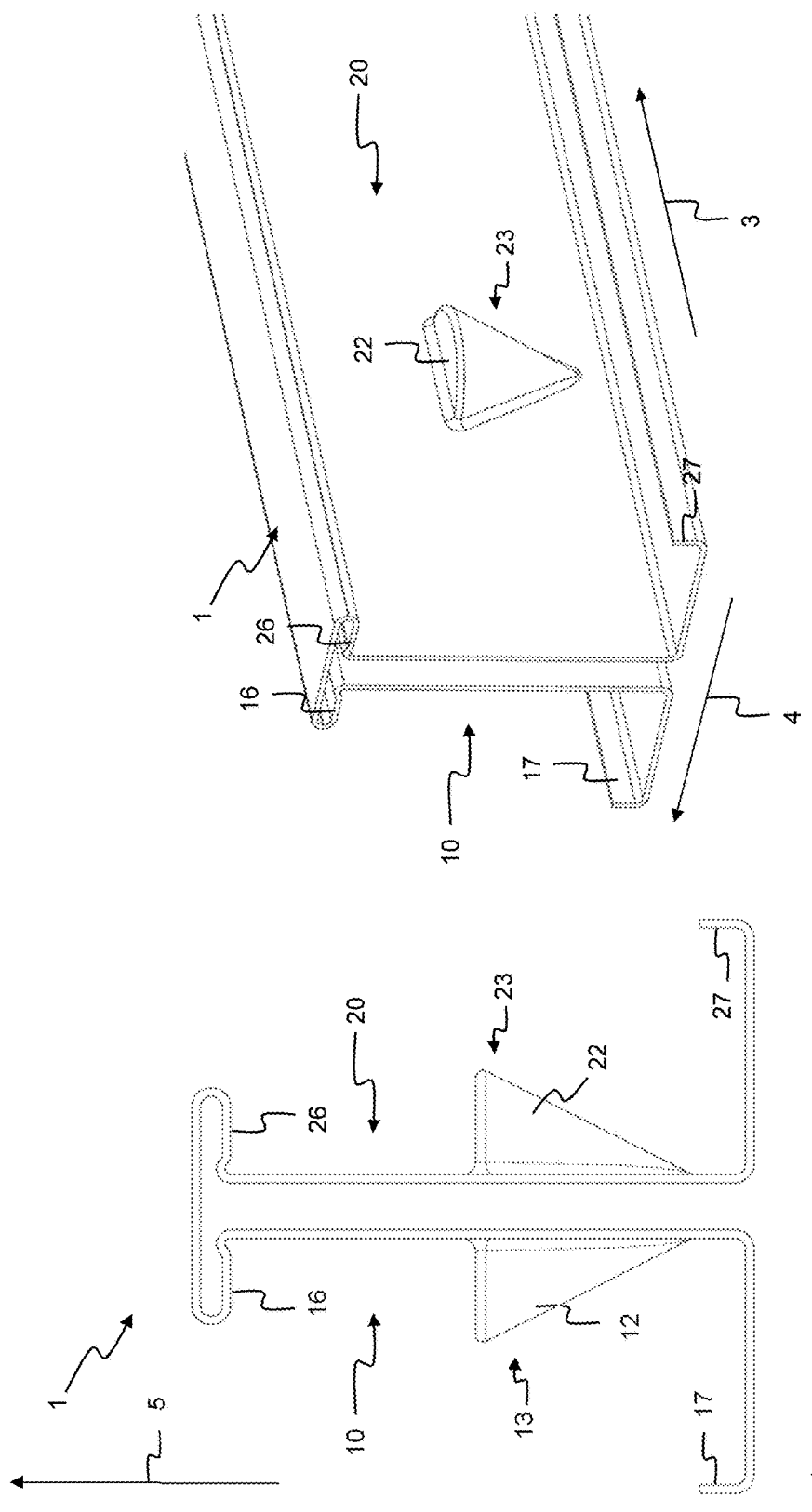

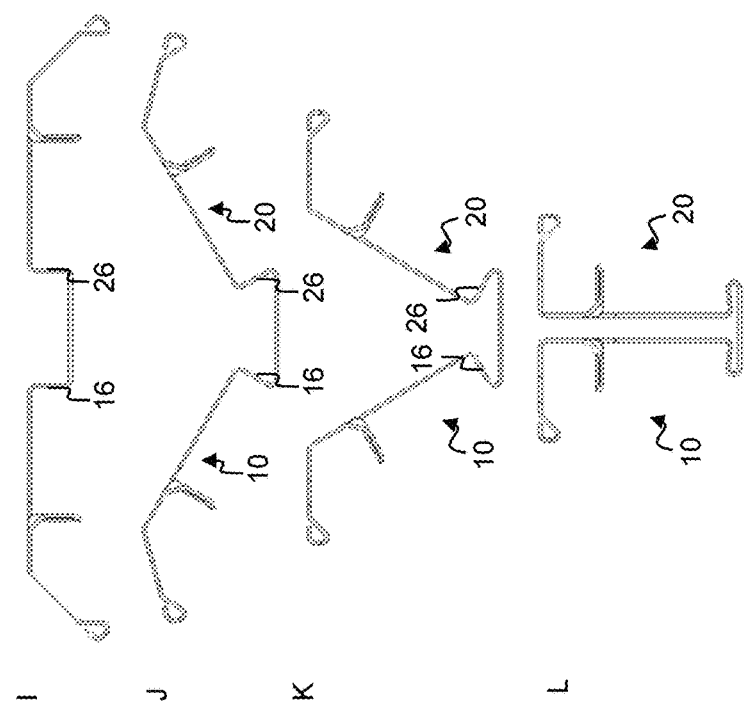
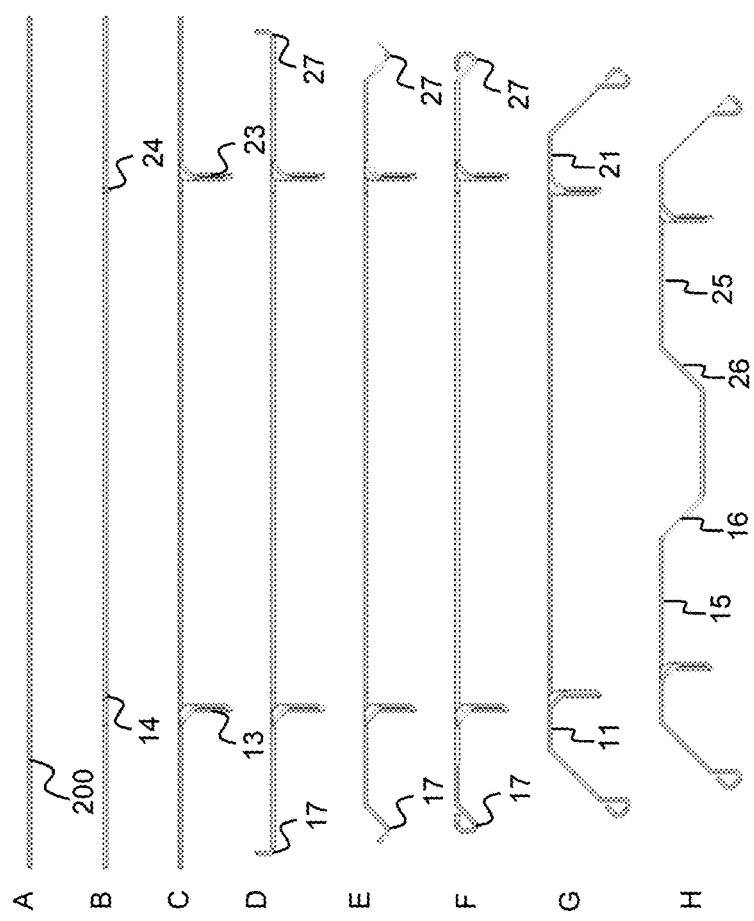
Fig. 17

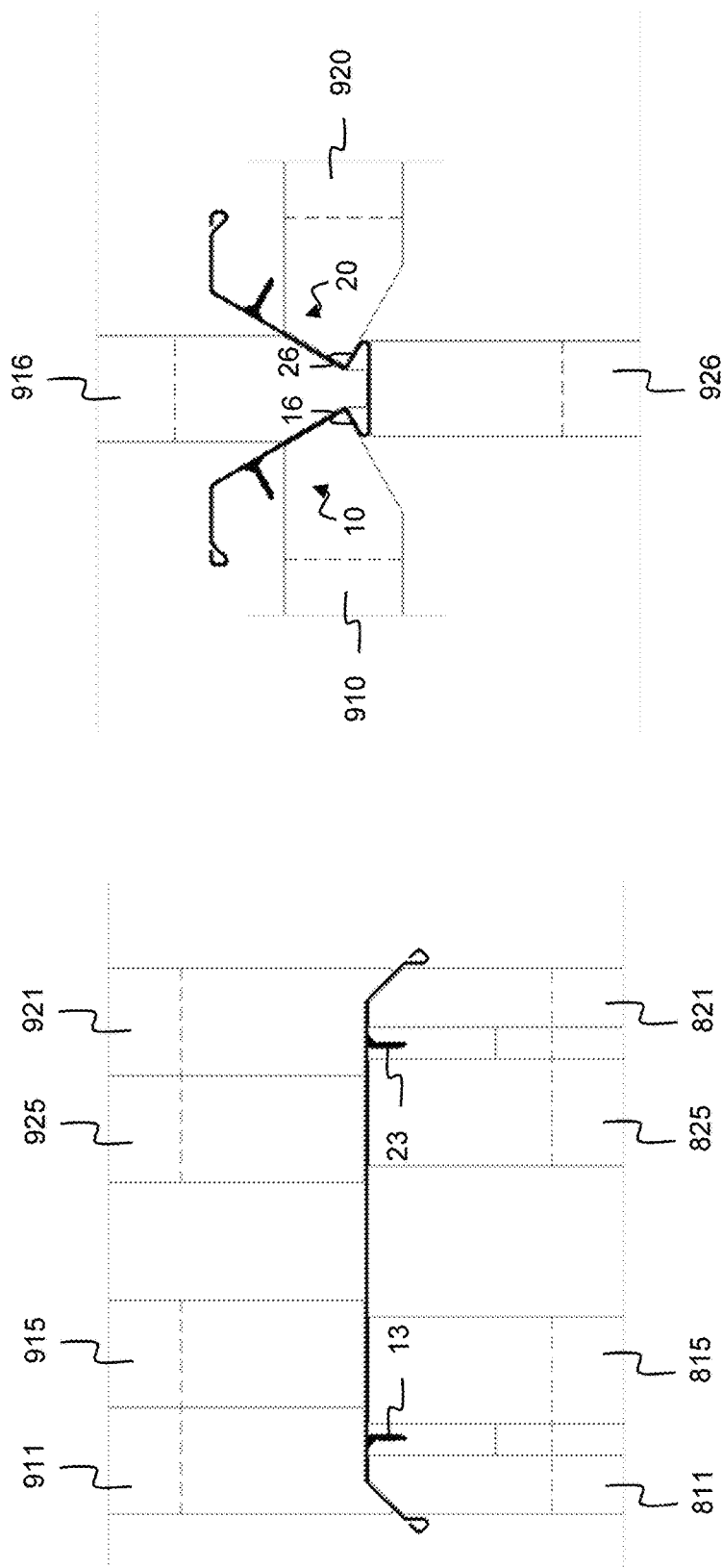

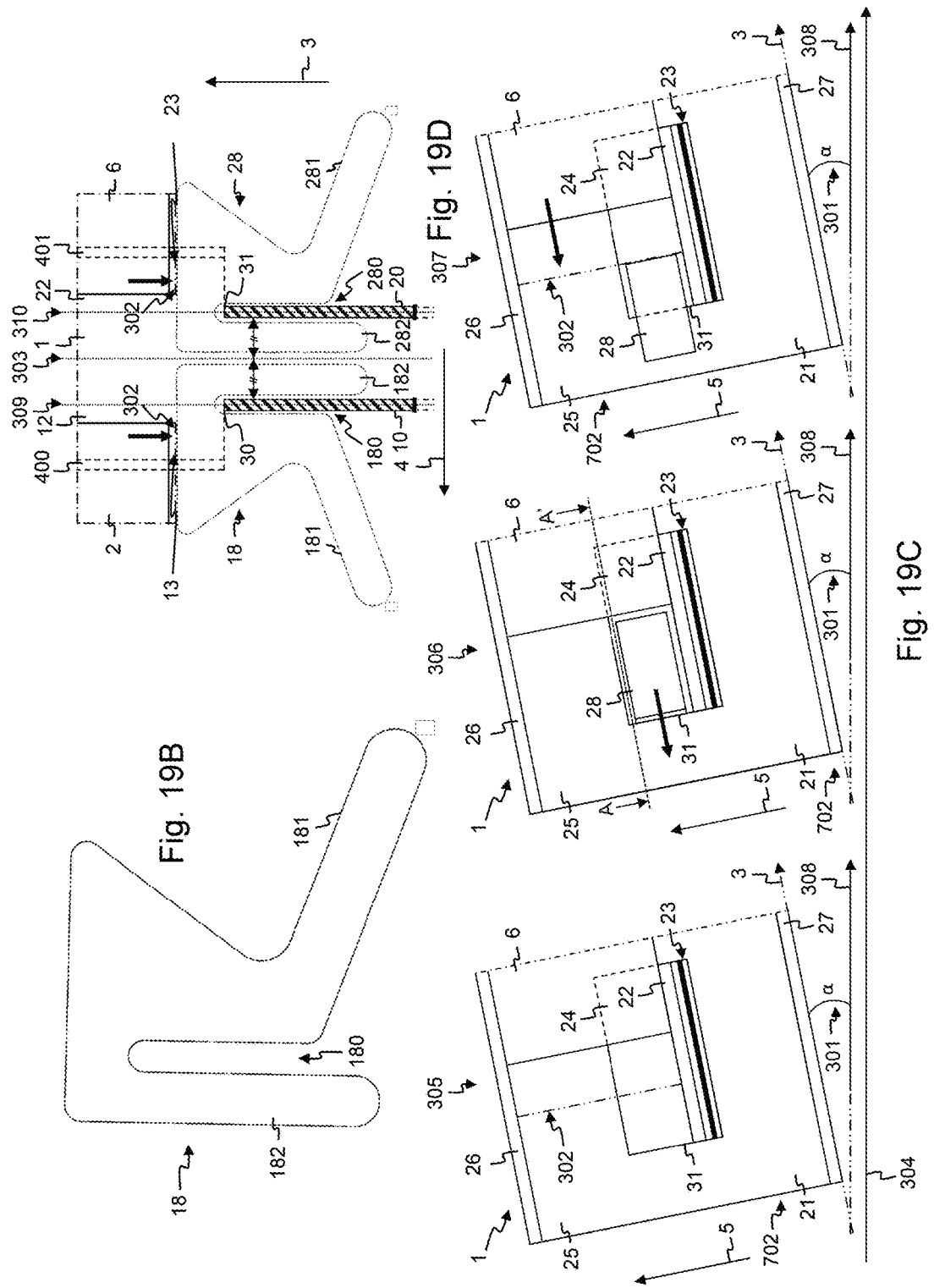

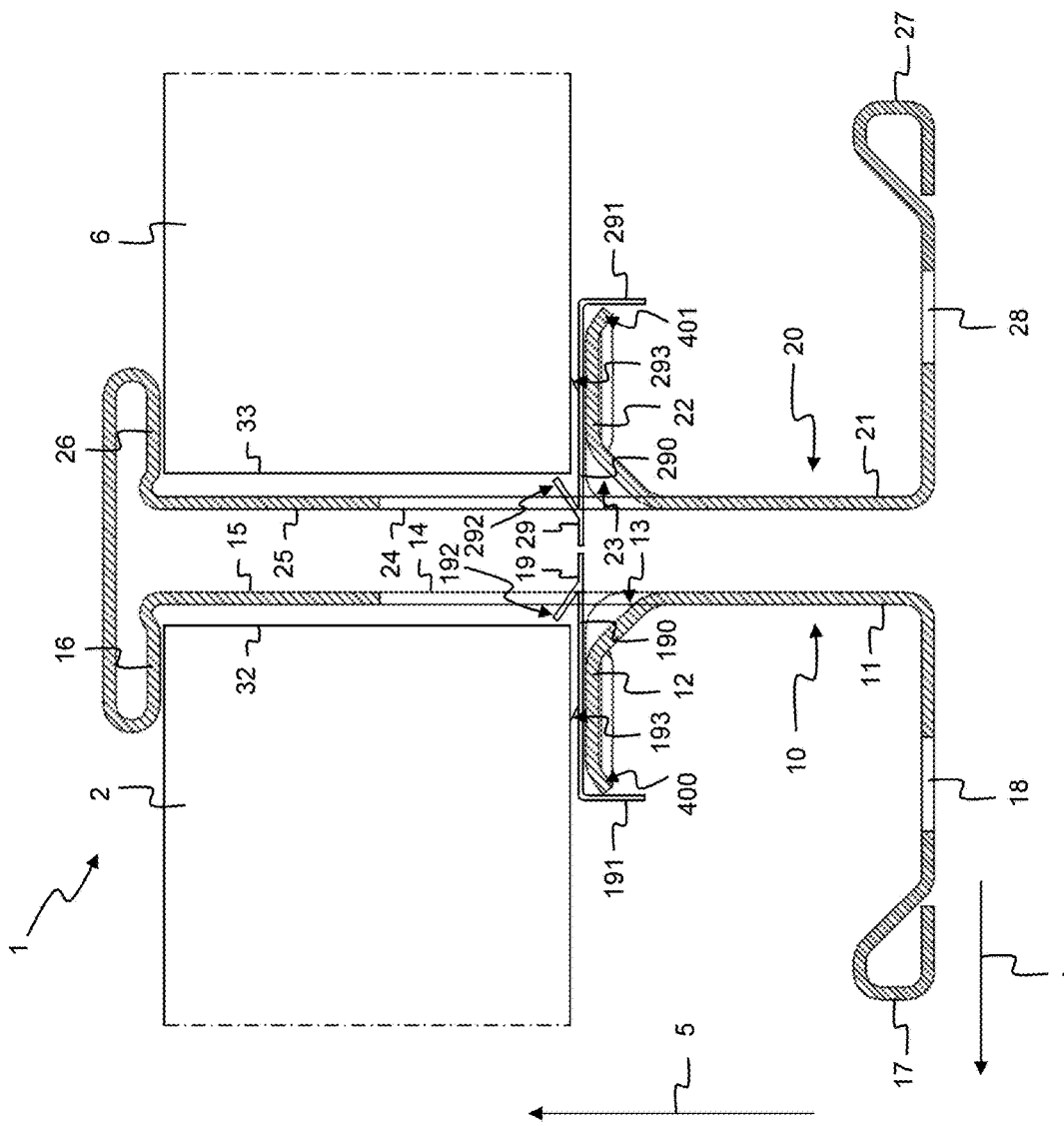

ASSEMBLY COMPRISING PROFILES FOR SUPPORTING A SOLAR PANEL

FIELD OF THE INVENTION

The present invention generally relates to a structural profile for supporting a solar panel, for instance a photovoltaic panel or a solar collector, and the related manufacturing method of the profile.

BACKGROUND OF THE INVENTION

Several techniques exist for the mounting of a solar panel on a structure. According to a first mounting technique, the solar panel can be positioned on top of the structure or slid along the structure. It is then secured to the structure with clips or connectors or it is secured to the structure with screws and bolts. A second mounting technique relies on sliding one or more solar panels along a profile designed to ensure the solar panel is secured to the structure with a reduced need for clips or connectors or other mounting means.

US 2006/0086382 is an example of the first mounting technique. The document discloses an assembly for mounting solar modules on a structure. The assembly comprises an upper rail, which is continuous and acts as a top cover for the solar, and a lower rail, which is the panel support on which the solar panel rests. The two rails are continuous along the length of the solar panel, and are secured together using a screw and a bolt. The upper rail and the lower rail are structured relative to each other so that at least one of them is moveable relative to the other one. The two rails secure the solar panel when the distance between the top cover and the panel support is equal to the thickness of the mounted solar panel.

The assembly disclosed in US 2006/0086382 relies on the use of two independent rails that are secured by means of bolts in order to be able to adapt to the thickness of different solar panels. The resulting torsion stiffness of the assembly, amongst other things, is dependent on the resistance of the screws and bolts. In order to enable the assembly to easily adapt to solar panels of different thickness, the upper and lower rail which are moveable relative to each other further do not demonstrate such a good bending strength and stiffness against vertical loads as it would have when the assembly would have been made in one piece, because of a reduced modulus of resistance and moment of inertia. The resistance of the resulting assembly to the weight of the mounted solar panel is important as such profiles need to have a considerable free span and so a good bending stiffness and resistance. Additionally, the screw and bolt 27 depicted on FIG. 6 prevent a solar panel from being secured closely to the two rails, and will avoid to easily slide the solar panel during mounting, as the channel in which the solar panel will be slid comprises lateral obstacles that will obstruct the sliding motion of the solar panel.

The screws and bolts that secure the profile disclosed in US 2006/0086382 need to be individually fastened, which drastically increases the mounting time. Furthermore, when several solar panels are positioned on the structure, the mounting is made more complex as solar panels located high above the ground need to be individually fastened to the structure. Such mounting structures, also known as solar tables can for example contain up to 6 solar panels oriented in landscape direction, which would for example result in a 6 meters-long mounting profile. These solar panels are mounted on the mounting profiles of the solar table inclined at an angle of for example 25 degrees. The highest point of such a solar table would then be located 3 meters above the ground, which is too high to reach from the ground by an operator installing the solar panels. The mounting of the solar panels on the solar table therefore would require extra equipment to access the high positioned solar panel, which increases the time and complexity of the mounting operation. The mounting of the solar panels at locations that cannot be reached from ground level could alternatively be executed by the technician by stepping on top of the already assembled solar panels to access the highest point. It is clear that this could result in damage of the already mounted solar panels and/or a reduction of their energy conversion efficiency.

The top cover and the panel support disclosed in US 2006/0086382 are continuous, which means they extend continuously along the longitudinal direction along the entire length of the panel support, thus partly covering the solar panel in a continuous way. The use of the material is not optimized, which increases the production costs, and which results in the manufacturing of a heavy structure. The weight of the assembly makes its mounting difficult and dangerous. Also, the friction induced by the large contact area of the continuous panel support with the solar panel during the sliding motion of the solar panel during its mounting is high. This makes the mounting difficult as extra force needs to be deployed to counteract the friction on the solar panel during sliding.

EP 2 413 381 discloses a continuous panel support on which a solar panel is slid (depicted in FIG. 12 as element 1140*b*). The frame of the solar panel itself needs to be designed to be able to slide along the rails of the profile. Solar panels are produced as commodity products, which makes them cheap. But the need for a special frame leads to additional costs which make the option disclosed in EP 2 413 381 expensive. Additionally, in order to reduce the friction induced by the continuous panel support and to facilitate the sliding movement of the solar panel, a low friction slidable surface such as Teflon-coated surface is applied on top of the panel support. This additional processing step however makes the manufacturing of the profile more complex.

EP 2 495 508 is another example of the first mounting technique. The document discloses a retaining clip for the assembly of solar panels on a profile. FIG. 17 shows an embodiment of such a retaining clip formed from a strip of material. The retaining clip comprises a top cover, a vertical wall, a panel support and two support pillars used to fixate the retaining clip to the profile. The clip is formed from a metal plate that is bent at right angles along its upper and lower edges, thereby respectively forming the top cover and the panel support and the vertical wall between the top cover and the panel support. The solar panel is positioned in the formed chamber between the top cover and the panel support, and rests on the panel support itself. The two bent-over strips forming the top cover and the panel support are divided into sections of the metal plate which are alternatively bent in opposite directions perpendicularly to the strip of material. Therefore, the top cover as well as the panel support are discontinuous along the direction of one dimension of the solar panel.

The top cover and the panel support of the retaining clip disclosed in EP 2 495 508 are formed of material of the vertical wall, by bending it at right angles respectively along its upper and lower edges. The solar panel rests on the panel support, positioned at the lower edge of the vertical wall. The flanges of the profile disclosed in EP 2 495 508 are not continuous. As a consequence, it presents a limited bending strength and stiffness around the strong axis.

The fact that the top cover disclosed in EP 2 495 508 is discontinuous also implies that the solar panel is more subject to damage at positions where it is not protected by the top cover. Indeed, under rainy and other difficult weather conditions, humidity as well as dirt, such as dust, leaves and branches, can accumulate at the edges of the top cover. On a long term basis, this will damage the solar panel and in any case reduces its conversion efficiency.

The top cover disclosed in EP 2 562 488 is not continuous. Under rainy and other difficult weather conditions, humidity as well as dirt, such as dust, leaves and branches, can accumulate at the edges of the top cover. Moreover, the discontinuities in the top cover form obstructions that prevent dirt from streaming downwards and will therefore be collected on top of the solar panel, which will reduce its performance. Also, when the profile is made out of a metal, in the outdoor environment it can react with a different metal, for instance the metal forming the frames of the solar panels, resulting in corrosion and degradation of the solar panel itself, especially when humidity and dirt can freely act as a catalyser for this process. On a long term basis, dirt and corrosion thus cause damage the solar panel which then reduces its energy conversion efficiency. Such long term effects are important as solar panels must however are expected to operate during a long-term period of for example 25 years from delivery and mounting.

EP 2 562 488 is an additional example of the second mounting technique. The document discloses a profile for holding a photovoltaic or solar collector module. The profile is formed by bending a single sheet metal plate and comprises a bottom support (depicted in FIG. 2 as element 7), a vertical wall (depicted in FIG. 2 as element 5), a panel support (depicted in FIG. 2 as element 10) and a top cover (depicted in FIG. 2 as element 4). The solar panel is positioned in the chamber created between the top cover and the panel support. The panel support presents a U-shaped form in cross-section. The top cover is intermittently formed along the length of the vertical wall. The panel support is continuously formed along the entire length of the vertical wall. The U-shape is formed by bending the sheet metal plate.

The chamber from EP 2 562 488 in which the solar panel is positioned is obtained by rolling and bending a single sheet metal layer. Therefore, the manufacturing process is adapted so that a fixed distance between the top cover and the panel support is delivered. This means that the manufactured profile is only compatible with a pre-determined thickness of solar panel. As soon as the thickness of the solar panels to be mounted on the profile changes, each manufacturing step defining and following the definition of the top cover and the panel support needs to be adapted to take the corrected distance between the top cover and the panel support into account. This is a complex and time-consuming process, which requires adjustments and reconfigurations of the parameters of the production line.

The strength and the resistance to torsion of the profile disclosed in EP 2 562 488 are limited. There is a high risk that such a profile will bend under the weight of the mounted solar panel or will deform during the mounting of the solar panel. This leads to additional time dedicated to the mounting of the solar panel.

DE202012008175 discloses an insertion profile for photovoltaic elements and an associated mounting system wherein the insertion profile demonstrates a special geometry using punched through tabs allowing further insertion of a photovoltaic module. FIG. 7 of DE202012008175 depicts an embodiment of such a structural profile that is similar to that schematically illustrated in FIG. 1A-B, FIG. 13 and FIG. 14. As visible in FIG. 1A and FIG. 1B, the structural profile 1 comprises a single wall 10, a panel support 13, an opening 14, a top cover 16 and a base section 17. The structural profile 1 is formed in a single metal plate, for instance aluminium or preferably steel. The height of the structural profile 1 and its wall 10 is defined along the height direction of the axis 5, and the width of the structural profile 1 is defined along the width direction of the axis 4. The top cover 16 extends from the single wall 10. This means that the top cover 16 projects from the plane of the wall 10. The base section 17 also extends from the wall 10, on the same side of the wall 10 as the corresponding top cover 16, and at a position below its corresponding top cover 16. Although, as shown in the embodiment of FIG. 1A and FIG. 1B, the top cover 16 and base section 17 project transverse from the vertical plane of the wall 10, it is clear that alternative embodiments are possible in which the angle at which the top cover 16 and or the base section 17 project from the plane of the wall 10 at another suitable angle. As shown, the panel support 13 also extends from the wall 10 on the same side of the wall 10 as the corresponding top cover 16. The panel support 13 is positioned below the corresponding top cover 16 and above the corresponding base section 17. As the panel support 13 is positioned between the top cover 16 and the base section 17, it is also clear that the distance from the panel support 13 to the top cover 16 is smaller than the height of the wall 10. The panel support 13 comprises a panel support section 12 formed of material taken from the wall 10. In general the panel support 13 is positioned below its corresponding top cover 16 such that a solar panel 2 can be slid between the panel support 13 and its corresponding top cover 16 Both the top cover 16 and the base section 17 are substantially continuous along said length direction 3 of the wall 10. As shown in FIG. 7 of DE202012008175, the structural profile 1 thus comprises a plurality of panel support sections 12 formed of material taken from the wall 10 from which its corresponding top cover 16 extends, the panel support sections 12 being spaced along the length direction 3 and arranged at substantially the same height along the wall 10. The panel support 13 is therefore discontinuous along the length direction 3. The lateral view shown in FIG. 1B is periodically repeated along the length direction 3 of the wall 10 of the structural profile 1 as shown in FIG. 7 of DE202012008175. According to an alternative embodiment, the panel support 13 can be repeated following a periodic pattern along the length direction 3 of the wall 10 of the structural profile 1 such that the panel support 3 can alternate on each side of the wall 10 along the length direction 3, as schematically illustrated in FIG. 8 of DE202012008175 and as schematically illustrated in the lateral view on FIG. 14.

The fact that in DE202012008175 the material taken for forming the panel support sections 13 is taken close to the neutral axis reduces the resistance of the structural profile to bending in the plane parallel to the wall 10 which forms the web of the structural profile 1. In other words, the fact that the structural profile 1 comprises a single wall 10 from which material is taken to form the panel support 13 reduces the bending stiffness and the bending strength around the strong axis of the structural profile 1, as the moment of inertia is largely determined in function of the height of the web formed by the first wall 10 and the width of the flanges formed by the continuous top cover 16 and the continuous base section 17. The modularity of the assembly formed by the structural profile 1 and the solar panels 2, 6 is considerably reduced due to the fact that the structural profile comprises a single wall 10. Indeed, as depicted in FIG. 1 of DE202012008175, two different types of structural profiles are used in the assembly of the structural profiles and the solar panels. The structural profiles labelled 11 and 13 on FIG. 1 of DE202012008175 are structural profiles with a single wall with panel supports made of material taken from the single wall. In order to assemble the solar panels and the structural profiles of FIG. 1 of DE202012008175, the panel supports extend on the same side of the structural profile such that the solar panel can rest on the panel supports. The structural profile labelled 12 on FIG. 1 of DE202012008175 is a structural profile with a single wall with panel supports made of material taken from the single wall but extending on both sides of the structural profile such that solar panels can rest on panel supports on both sides of the structural profile. In other words, the structural profile labelled 12 on FIG. 1 of DE202012008175 comprises alternating panel supports such that solar panels can rest on panel supports on both sides of the single wall of the structural profile. The assembly of the structural profiles and of the solar panels therefore requires the manufacturing of two different types of structural profiles, which increases the complexity of the assembly and of the manufacturing, as well as the costs generated by the manufacturing and the time needed to assemble the structural profiles and the solar panels.

DE202012008175 describes an assembly for which solar panels are loaded on structural profiles in several consecutive steps. As depicted in FIG. 1 of DE202012008175, three structural profiles are mounted to form a frame on which solar panels are going to be assembled. Once the structural profiles are suitably mounted together, a solar panel is positioned such that the longest sides of the solar panel are parallel to the width direction 4 depicted in FIG. 13. The solar panel is then tilted under a suitable angle with respect to the width direction 4 of FIG. 13 such that the solar panel can be inserted between the top cover of a structural profile and a panel support of the corresponding structural profile, such that the solar panel rests on a panel support of the structural profile. The angle between the solar panel and the width direction 4 of FIG. 13 is then reduced until the solar panel rests on the panel support of another structural profile of the frame. For example, in FIG. 1 of DE202012008175, a first row of solar panels is for example tilted under a suitable angle with respect to the width direction 4 of FIG. 13 and the solar panels are inserted between the top cover of the structural profile 12 and the panel supports of the structural profile 12 that are formed of material taken from the single wall of the structural profile 12 and extend in the same direction as the width direction 4 of FIG. 13. As visible in FIG. 1 of DE202012008175, the angle between the solar panels and the width direction 4 is then reduced until the solar panels rest on the panel supports of the structural profile 12 of FIG. 1 of DE202012008175. Similarly, in FIG. 1 of DE202012008175, a second row of solar panels is for example tilted under a suitable angle with respect to the width direction 4 of FIG. 13 and the solar panels are inserted between the top cover of the structural profile 12 and the panel supports of the structural profile 12, formed from material taken from the single wall of the structural profile 12 but extending in the opposite direction of the width direction 4 of FIG. 13, i.e. in the opposite direction of the panel supports on which the first row of solar panels rests. As visible in FIG. 1 of DE202012008175, the angle between the solar panels and the width direction 4 is then reduced until the solar panels rest on the panel supports of the structural profile 12 of FIG. 1 of DE202012008175. There exists a risk that the solar panels are positioned at the furthest edge of the panel supports of the structural profiles from the single wall, as illustrated on FIG. 5 of DE202012008175 where the solar panel labelled 21 rests on the edge of the panel support labelled 15 the furthest from the single wall labelled 13. This increases the risk that solar panels slip from the panel supports and are damaged if the solar panels slip from between the top cover and the corresponding panel support and fall on the floor. For example, in FIG. 1 of DE202012008175, after a solar panel is inserted under a suitable angle between the top cover and the corresponding panel support of the structural profile labelled 11 on FIG. 1 of DE202012008175, the angle between a solar panel of the first row and the width direction 4 may be reduced until the solar panel rests very close to the edge of the free end of a corresponding panel support of the structural profile labelled 12 on FIG. 1 of DE202012008175. There exists a risk that this solar panel will not be securely resting between the top cover of the structural profile labelled 12 on FIG. 1 of DE202012008175 and the corresponding panel support and there exists a risk that the solar panel slips and drops from the structural profile labelled 12 on FIG. 1 of DE202012008175. The solar panel may then also slip from in between the top cover and a corresponding panel support of the structural profile labelled 11 on FIG. 1 of DE202012008175 and may as a result fall on the ground and be consequently damaged. Alternatively, there exists a risk that the solar panel does not entirely slip from in between the top cover and a corresponding panel support of the structural profile labelled 11 on FIG. 1 of DE202012008175, but is then submitted to a torsion as one edge of the solar panel is secured on a structural profile and the opposite edge of the solar panel hangs free. This can result in cracks in the structure of the solar panel. These possible damages considerably jeopardize the intrinsic quality of the material of the solar panels and therefore reduce the overall conversion efficiency of the solar cells of the solar panel. Additionally, the fact that during the mounting operation the solar panels must be positioned at the furthest edge of the panel supports of the structural profiles, furthest away from the single wall, such as illustrated in FIG. 5 of DE202012008175 results in large torsional forces acting on the panel supports hinging from the single wall of the structural profile. Indeed, on FIG. 5 of DE202012008175, the weight of the solar panel labelled 21 is not spread over the surface of the panel support parallel to the width direction 4, but the weight of the solar panel labelled 21 mainly leans on the edge of the panel support labelled 15 the furthest from the single wall labelled 13. This drastically increases the stress induced on the panel support, and on the single wall of the structural profile. There exists a risk that either the panel support bends under the weight and the pressure induced by the solar panel at the junction between the panel support and the single wall, and/or that the single wall itself bends under the weight and the pressure induced by the solar panel. As the top cover of the structural profile is continuous, a bent of the single wall threatens the integrity of the entire assembly of solar panels already assembled to the same structural profile. This may result in damage of solar panels already assembled to the same structural profile that may fall on the ground. Additionally, as the top cover of the structural profiles labelled 11, 12 and 13 in FIG. 1 of DE202012008175 is continuous along the length direction 3 depicted in FIG. 14, a limitation associated to the assembly depicted in FIG. 1 of DE202012008175 is that all the solar panels of the first row or of the second row must be simultaneously assembled with the structural profiles in order to guarantee that all the solar panels of the same row securely rest on the panel supports of the structural profiles as described above. It is only then that the structural profiles labelled 11,13 can be moved by elements 51,52,53 closer to structural profile 12 along a direction transverse to their length direction for securely inserting the opposing edges of the solar panels between their continuous top cover and the panel supports. This limits the modularity: the assembly must comprise structural profiles labelled 11, 13 at the top and the bottom of the assembly that are movable in order to secure the solar panels. Only two rows of solar panels can then be securely mounted: one row between the structural profile labelled 11 and the structural profile 12 and one row between the structural profile labelled 13 and the structural profile 12. This further reduces the ergonomics of the mounting operation for the assembly of structural profiles and solar panels. Indeed, the highest row of the assembly is difficult to reach as the assembly lies under an angle with respect to a horizontal direction. This increases the complexity of the mounting of solar panels on the highest row of the assembly. Also, the highest row comprises solar panels that must secured between the structural profile labelled 11 and the structural profile 12 one by one by the previously described tilting operation. This further increases the complexity of the mounting of solar panels on the highest row of the assembly. Additionally, mounting solar panels on the assembly of DE202012008175 requires that the structural profiles labelled 11,13 are beforehand carefully positioned with respect to the structural profile 12 in order to allow the insertion of solar panels in between their respective top covers and their respective corresponding panel support, without having the solar panels falling of their panel supports. This further increases the complexity of assembling the solar panels and the structural profiles. Additionally, the assembly described in DE202012008175 requires to coordinate the movement of all the elements 51,52,53 of a structural profile when all the solar panels of one row are mounted such that all the solar panels on this row are simultaneously and correctly secured by the respective structural profiles labelled 11,13 in a final mounted position.

WO2010/054617 describes an assembly for which solar panels are loaded on structural profiles in several consecutive steps. As depicted in FIGS. 9 to 11 of WO2010/054617, a solar panel labelled 2 is first inserted under an angle between the top cover and the corresponding panel support of a structural profile labelled 7a, as depicted in FIG. 9 of WO2010/054617. The angle between the solar panel labelled 2 and the frame structure labelled 5 is then subsequently decreased until the solar panel labelled 2 touches a structural profile labelled 7b, non-identical to the structural profile labelled 7a as it does not comprise a top cover, positioned parallel to the structural profile labelled 7a. The solar panel labelled 2 then rests on the panel supports of the structural profiles labelled 7a and 7b in a final mounted position, as depicted in FIG. 10. The solar panel labelled 2 is then securely fixed to the frame structure labelled 5 when a mounting operator manually inserts the element labelled 23 in the structural profile labelled 7b, thereby securely clamping the solar panel labelled 2 to the structural profile labelled 7b, between the element 23 and the panel support of the structural profile labelled 7b, as depicted in FIG. 11. The limitations of the assembly from WO2010/054617 are similar to the limitations of the assembly from DE202012008175 and previously described. The solar panels in WO2010/054617 are tilted to be inserted in the structural profiles of the assembly, which increases the complexity of the mounting of solar panels on the frame structure labelled 5. The ergonomics for mounting such an assembly are limited, especially with respect to the higher row of solar panels which is difficult to reach and for which an operator not only has to position solar panels in the structural profiles labelled 7a, but also has to securely clamp the solar panels to the frame structure labelled 5 by manually clicking the element labelled 23 from the top side after the solar panels are have been positioned on the assembly. Additionally, the assembly described in WO2010/054617 requires the use of a combination of two different structural profiles, labelled 7a and 7b in FIGS. 9 to 11 of WO2010/054617. Indeed, a solar panel can only be secured on the frame structure labelled 5 when it is secured between a structural profile labelled 7a and a structural profile labelled 7b. This reduces the flexibility and increases complexity of the assembly described in WO2010/054617, and the associated mounting operation. Additionally as profile labelled 7b comprises only discrete clamping elements, there is a high risk of moisture and dirt accumulating, and a consequent risk for corrosion and decrease of efficiency of the solar panels. Additionally as the continuous top covers of the profiles labelled 7a are substantially horizontal along their length direction, they form a continuous barrier for any moisture, dirt, etc. flowing along the solar panels under influence of gravity, thereby also increasing the consequent risk for corrosion and decrease of efficiency of the solar panels.

It is an objective of the present invention to disclose a profile and the related manufacturing process that overcome the above identified shortcomings of existing profiles. More particularly, it is an objective to disclose a profile that is easily adaptable to the different thicknesses of solar panels. It is a further objective to disclose a profile that is easy to fabricate, lightweight, mechanically strong, and reduces the manufacturing and installation cost as well as the waste of material. It is a further objective to disclose a profile that enables to deploy solar installations with increased lifetime, reduced maintenance costs and increased conversion efficiency.

SUMMARY OF THE INVENTION

According to a first aspect of the invention, there is provided an assembly comprising at least two structural profiles arranged parallel to each other with respect to their length direction and at least one solar panel, wherein: each of the structural profiles comprises:

- a first wall from which a first top cover, a corresponding first base section at a position below the first top cover, and a corresponding first panel support at a position below the first top cover and above the first base section extend;
- a second wall from which a second top cover, a corresponding second base section at a position below the second top cover, and a corresponding second panel support at a position below the second top cover and above the first base section extend;
- the second wall being substantially parallel to the first wall and positioned on the opposite side of the first top cover; and the second top cover extending from the second wall on the opposite side of the first wall and the first top cover being coupled to the second top cover;
- the first and second base sections, and the first and second top covers extending continuous along the length direction; and
- each of the first and second panel support extending from its corresponding wall at a position below its corresponding top cover, such that the solar panel can be slid between this panel support and its corresponding top cover along its corresponding wall in the length direction; and each of the first and second panel support comprising a plurality of spaced panel support sections formed of material taken from its corresponding wall, and wherein each of the plurality of structural profiles is positioned such that, in between the respective top covers and their corresponding panel supports of adjacent structural profiles, along the length direction, at least one solar panel can be slidably mounted at both its opposing edges.

In accordance with the present invention, solar panels are slidably and sequentially mounted on the assembly along the length direction of the structural profiles. In other words, each solar panel is inserted on top of respective spaced panel support sections and below respective continuous top covers of two adjacent structural profiles and positioned in between these two adjacent and identical structural profiles of the assembly. The sequentially inserted solar panels are then guided in between the two identical and adjacent structural profiles and are then slid on top of the respective spaced panel support sections along the length direction of the structural profile until all solar panels have been sequentially inserted and reach a final mounted position. The spaced panel support sections enable a reduction of the contact surface which reduces resistance during the sliding movement of the sequentially inserted solar panels during a mounting operation. Additionally the continuous top covers prevent moisture, dirt, debris, etc. from infiltrating in between the solar panels at the location of the structural profile, thereby reducing the risk for corrosion. There is no need for all the solar panels of one row or of one column to be simultaneously assembled with the structural profiles in order to guarantee that all the solar panels of the same row or of the same column securely rest on the panels supports of the same structural profiles. The modularity of the assembly is also substantially improved compared to the prior art structural profile as only a single type of identical structural profiles can be used which can all be arranged in the same orientation, parallel to each other, thereby reducing the possibility for errors during mounting the structural profiles of the assembly. Additionally the assembly can be extended without further complexity or compromising the efficiency of the mounting operation, as it only requires providing for additional parallel identical structural profiles. The sequential slidable mounting of the solar panels on the assembly further improves the ergonomics of the mounting operation for the assembly of solar panels on the structural profiles. Indeed, solar panels are sequentially mounted on the structural profiles of the assembly from the side of the assembly that is the easiest for a mounting operator to reach. Further this assembly also allows to mount all parallel structural profiles before subsequently introducing the solar panels in between, as the width of the spaced panel supports can be chosen sufficiently large to reliably copy with any tolerances with respect to the dimensions of the solar panel because of their introduction by means of a sliding motion at one end of the parallel structural profiles in between which they are inserted, without any need for a pivoting motion of the solar panels. Additionally, securing a solar panel to the structural profiles does not require to manually clamp the solar panel to the structural profile with for example clamping elements. This further reduces the complexity of the mounting and also reduces the risk of accumulation of moisture and dirt at the position of the clamping elements, thereby reducing a consequent risk of corrosion and of decrease of efficiency of the solar panels.

In accordance with the present invention, the complexity of the mounting method itself is considerably reduced as solar panels are sequentially slid along the length direction of the assembly in between two adjacent and identical structural profiles. Indeed, in order to be secured in between two adjacent structural profiles, a solar panel must not be tilted anymore under a suitable angle with respect to the width direction of the assembly before being lowered to rest on the panel supports of the structural profile. Additionally, the fact that solar panels are sequentially slid along the length direction of the assembly eliminates the risk that a solar panel slips from in between the top cover and the corresponding panel support of a structural profile and falls on the ground or that the pivoting motion of the solar panel causes permanent deformations or damage to the panel support or top cover and vice versa. In other words, the assembly according to the present invention allows for a method of mounting that guarantees that a solar panel is not submitted to undesirable levels of torsion or bending as both edges of the solar panel are reliably supported on a structural profile during the sliding operation for sequentially inserting the solar panels. Consequently, the intrinsic quality and the original overall conversion efficiency of the solar cells of a solar panel are guaranteed even after the solar panel is secured in its final mounted position.

In accordance with the present invention, each structural profile of the assembly comprises a first wall and a second wall. As the moment of inertia of the structural profiles is largely determined by the height of the web formed by the respective vertical walls and the width of the flanges formed by the respective continuous covers and the respective continuous base sections, the bending stiffness and the bending strength around the strong axis of the structural profiles of the assembly are improved compared to the ones of a structural profile comprising a single wall. Additionally, the weight of a solar panel slid in between two adjacent and identical structural profiles is spread over the panel supports of the two structural profiles, thereby reducing the stress induced by a solar panel on the panel supports of each structural profile. The risk that the panel support of the first wall of one structural profile and/or the panel support of the second wall of another adjacent structural profile bend under the weight and the pressure induced by one solar panel mounted in between two adjacent structural profiles is therefore reduced, and the integrity of the assembly is guaranteed.

According to an optional embodiment, the assembly is further characterized in that at least two parallel structural profiles are identical, and are arranged adjacent to each other along a direction transverse to the length direction, such that at least one solar panel can be slidably mounted along the length direction in between each of the adjacent, identical structural profiles.

According to an optional embodiment, the assembly is further characterized in that the assembly further comprises a plurality of parallel, longitudinal transverse elements, extending along a width direction transverse to the length direction, on which the parallel structural profiles are mounted, the distance between the adjacent longitudinal transverse elements being larger than the width of at least one solar panel along the length direction.

In accordance with the present invention, the amount of structural profiles needed to efficiently support solar panels mounted on the assembly is minimized. Indeed, a solar panel is secured along the length direction in between two adjacent and identical structural profile and the assembly is supported along the width direction by a frame comprising longitudinal transverse elements extending along the width direction and positioned at distances larger than the width of at least one solar panel along the length direction. This way, the costs associated with the supporting the assembly of structural profiles and solar panels are minimized and the amount of time needed to mount the frame supporting the assembly is reduced.

According to an optional embodiment, the assembly is further characterized in that each of said parallel structural profiles are mounted such that in between each of the adjacent structural profiles two or more identical solar panels can be sequentially slidably mounted along the length direction in landscape orientation with respect to the width direction.

According to an optional embodiment, the assembly is further characterized in that the length direction of each of the parallel structural profiles is inclined at an angle with respect to a horizontal plane, such that each of the parallel structural profiles extends along the length direction from a lowest end at a first height above the horizontal plane to a highest end at a second height above the horizontal plane, the second height being larger than the first height.

In accordance with the present invention, the structural profiles of an assembly may be inclined at an angle with respect to a horizontal plane. A lowest end of the structural profiles is defined as the side of the structural profiles for which the distance to the horizontal plane is the smallest and a highest end of the structural profiles is defined as the side of the structural profiles for which the distance to the horizontal plane is the largest. This still further reduces the risk for accumulation of moister, dirt, debris, etc. as the respective continuous top covers of the parallel structural profiles in this way don't form an obstruction for the downwards flow of moisture, dirt or debris on top of the solar panels, thereby still further reducing the risk for corrosion and maximizing the operational efficiency of the solar panels. Additionally solar panels can be more easily and ergonomically mounted even at the position associated with the highest row of solar panels of this assembly, i.e a row of solar panels near the highest end of the structural profiles of the assembly, because the solar panels can be sequentially introduced, by introducing each solar panel one after the other at the lowest end in between two adjacent parallel structural profiles and consequently sliding this growing sequence of solar panels, which forms a column of solar panels along the length direction, in between two parallel structural profiles of the assembly until the highest solar panel of this sequence, which was first introduced at the lowest end reaches its final mounted position at the highest end of the adjacent parallel structural profiles. The mounting operation of the solar panels can thus be performed entirely at the lowest end, without a need for accessing the more difficult to reach highest end. In this way the complexity of the mounting is reduced as there is no need for a mounting operator to physically reach the highest row of the assembly in order to introduce, position and secure solar panels even at the highest row of solar panels of the assembly. It is clear that preferably the length direction is aligned with, or at most at a sharp angle with respect to the north-south direction and consequently the width direction is aligned with the east-west direction, or at most at a sharp angle therewith, as in this way an optimal angle for capturing the sunlight can be achieved. Additionally this means that the assembly can also be easily scaled along the length direction of structural profiles, as this does not affect the efficiency of the mounting operation because of the sequential, slidable mounting operation of the solar panels which is performed at the lowest end of the structural profiles remains unaffected if the length of the structural profiles is increased for allowing a higher number of solar panels in a column along the length direction, which leads to an increase of the height of the highest end of these structural profiles and the highest row of solar panels arranged in the assembly.

According to an optional embodiment, the assembly is further characterized in that each of the parallel structural profiles are mounted such that in between each of the adjacent structural profiles two or more identical solar panels can be sequentially slidably mounted from the lowest end along the length direction to the highest end.

In accordance with the present invention, solar panels are sequentially slid along the length direction of the assembly until each solar panel reaches its final mounted position. This way, all the solar panels of a column or of a row may be sequentially slidably mounted on the structural profiles of the assembly from a side of the assembly that is the easiest for a mounting operator to reach and from which it is the easiest for him to slide solar panels along the structural profiles. This facilitates the mounting of solar panels on the structural profiles.

According to an optional embodiment, the assembly is further characterized in that the assembly further comprises, for each of the corresponding walls of each of the structural profiles along which solar panels are slidably mounted, a stop element inserted in an opening of the corresponding wall between the solar panels and the lower end of the structural profile, the stop element comprising a groove extending along the length direction towards the lower end in which the corresponding wall can be introduced until reaching the end of the groove in a final secured position, in which, the stop element stops said slidably mounted solar panels in a final mounted position.

In accordance with the present invention, a stop element is a simple and efficient way of securing a solar panel in its final mounted position at the lowest end of structural profiles of an assembly. Additionally, thanks to the symmetry of the structural profile, the stop element may be inserted either in an opening of the first wall or in an opening of the second wall of a structural profile simply by rotating the stop element so as to obtain a mirrored stop element. This symmetry minimizes the costs associated with the use of a stop element.

According to an optional embodiment, the assembly is further characterized in that the first base section is coupled to the second base section.

This way, the structural profile in the case of a double wall double top cover and corresponding double base section and panel support forms a profiled box beam, also known as box girder or tubular girder, which compared to the embodiments of the structural profile referred to above has an increased resistance against torsional loading, to withstand for example torsional loads that for example occur during the insertion of solar panels. According to particular embodiments, the torsional stiffness during the mounting of the solar panels will be realized by a coupling between both base sections by means of a rigid connection. According to an embodiment this can for example be realized by screwing both base sections to a stiff element forming a structure on which the structural profile is mounted, also referred to as understructure, so that a similar torsion stiffness will be realized as in the case of a box beam as the torsion stiffness is largely determined by the encircled surface or space between the two walls of the profile.

According to an optional embodiment, the assembly is further characterized in that the first wall and the second wall extend upright between their corresponding base section and top cover over at least 70%, preferably at least 80% of their total height.

This way, the flexibility of the use of the assembly is increased as the assembly is made compatible with any thickness of solar panel. Depending on the thickness of the solar panel ensured between the top cover and a panel support of the first wall or of the second wall of a structural profile, the height of the first wall or the second wall extending upright between the top cover and the base section may be adapted. According to an alternative embodiment, the first wall and the second wall extend upright over at least 65% to 85% of their total height.

According to a second aspect of the invention, there is provided a method of mounting the assembly according to a first aspect of the invention, characterized in that the method comprising the steps of:
  arranging the plurality of structural profiles parallel to each other; and
  positioning each of the plurality of structural profiles such that, in between the respective top covers and their corresponding panel supports of adjacent structural profiles, along the length direction, at least one solar panel can be slidably mounted at both their opposing edges.

This way, the structural profiles of the assembly are first arranged parallel to each other before at least one solar panel is slidably mounted on the structural profiles. This increases the efficiency of the mounting of the solar panel on the structural profiles.

In accordance with the present invention, solar panels are slidably and sequentially mounted on the assembly along the length direction of the assembly. In other words, each solar panel is positioned in between two adjacent and identical structural profiles of the assembly, is then guided in between the two identical and adjacent structural profiles and is then slid along the length direction of the assembly until it reaches a final mounted position. There is no need for all the solar panels of one row or of one column to be simultaneously assembled with the structural profiles in order to guarantee that all the solar panels of the same row or of the same column securely rest on the panels supports of the same structural profiles. The modularity of the assembly is consequently substantially improved compared to the one of a structural profile comprising a single wall. The sequential mounting of the solar panels on the assembly further improves the ergonomics of the mounting operation for the assembly of solar panels on the structural profiles. Indeed, solar panels are sequentially mounted on the structural profiles of the assembly from the side of the assembly that is the easiest for a mounting operator to reach. Additionally, securing a solar panel to the structural profiles does not require to manually clamp the solar panel to the structural profile with for example clamping elements. This further reduces the complexity of the mounting and also reduces the risk of accumulation of moisture and dirt at the position of the clamping elements, thereby reducing a consequent risk of corrosion and of decrease of efficiency of the solar panels.

In accordance with the present invention, the complexity of the mounting method itself is considerably reduced as solar panels are sequentially slid along the length direction of the assembly in between two adjacent and identical structural profiles. Indeed, in order to be secured in between two adjacent structural profiles, a solar panel must not be tilted anymore under a suitable angle with respect to the width direction of the assembly before being lowered to rest on the panel supports of the structural profile. Additionally, the fact that solar panels are sequentially slid along the length direction of the assembly eliminates the risk that a solar panel slips from in between the top cover and the corresponding panel support of a structural profile and falls on the ground. In other words, the method of mounting according to the present invention guarantees a solar panel is not submitted to torsion as one edge of the solar panel is secured on a structural profile and the opposite edge of the solar panel hangs free. Consequently, the intrinsic quality and the original overall conversion efficiency of the solar cells of a solar panel are guaranteed even when the solar panel is secured in its final mounted position.

In accordance with the present invention, each structural profile of the assembly comprises a first wall and a second wall. As the moment of inertia of the structural profiles is largely determined by the height of the web formed by the respective vertical walls and the width of the flanges formed by the respective continuous covers and the respective continuous base sections, the bending stiffness and the bending strength around the strong axis of the structural profiles of the assembly are improved compared to the ones of a structural profile comprising a single wall. Additionally, the weight of a solar panel slid in between two adjacent and identical structural profiles is spread over the panel supports of the two structural profiles, thereby reducing the stress induced by a solar panel on the panel supports of each structural profile. The risk that the panel support of the first wall of one structural profile and/or the panel support of the first wall of one structural profile bend under the weight and the pressure induced by one solar panel mounted in between two adjacent structural profiles is therefore reduced, and the integrity of the assembly is guaranteed.

According to an optional embodiment, the method further comprises the step of sequentially slidably mounting two or more identical solar panels in between each of the adjacent structural profiles from the lowest end along the length direction to the highest end.

In accordance with the present invention, solar panels are sequentially slid along the length direction of the assembly until each solar panel reaches its final mounted position. This way, all the solar panels of a column or of a row may be sequentially slidably mounted on the structural profiles of the assembly from a side of the assembly that is the easiest for a mounting operator to reach and from which it is the easiest for him to slide solar panels along the structural profiles. This facilitates the mounting of solar panels on the structural profiles.

According to an optional embodiment, the method further comprises the steps of, for each of the corresponding walls of each of the structural profiles along which solar panels have been slidably mounted,
  inserting the stop element in an opening of the corresponding wall between the solar panels and the lower end of the structural profile;
  positioning the stop element such that the groove extends along the length direction towards the lower end;
  introducing the corresponding wall in the groove until reaching the end of the groove in a final secured position;
  the stop element stopping the slidably mounted solar panels in a final mounted position.

In accordance with the present invention, a stop element is inserted in an opening of a first wall or a second wall of a structural profile after at least one solar panel has been slidably mounted on the structural profile. This is a simple and efficient way to secure the solar panel in a final mounted position.

According to an optional embodiment, the method further comprises the step of inserting at least one grounding element comprising a planar platform in between at least one of the slidably mounted solar panels when in their final mounted position and at least one of the corresponding panel supports on which the respective end of the respective solar panel rests.

This is a simple and efficient way of grounding the solar panels of the assembly without damaging the surface of the solar panels. The absence of scratches at the surface of the solar panels and/or the absence of drilled holes needed to ground the solar panels guarantee the integrity of the solar cells of the solar panels and therefore ensure an optimum conversion efficiency of the solar panels.

According to a third aspect of the invention, there is provided a structural profile for use in an assembly according to a first aspect of the invention, characterized in that said structural profile comprises:
- a first wall from which a first top cover, a corresponding first base section at a position below the first top cover, and a corresponding first panel support at a position below the first top cover and above the first base section extend;
- a second wall from which a second top cover, a corresponding second base section at a position below the second top cover, and a corresponding second panel support at a position below the second top cover and above the first base section extend;
- the second wall being substantially parallel to the first wall and positioned on the opposite side of the first top cover and the second top cover extending from the second wall on the opposite side of the first wall and the first top cover being coupled to the second top cover;
- the first and second base sections, and the first and second top covers extending continuous along said length direction; and
- each of the first and second panel support extending from its corresponding wall at a position below its corresponding top cover, such that the solar panel can be slid between this panel support and its corresponding top cover along its corresponding wall in the length direction; and
each of the first and second panel support comprising a plurality of spaced panel support sections formed of material taken from its corresponding wall.

In the context of the invention, the first wall and the second wall of the structural profile substantially extend along the length direction over a distance of more than one meter. The height of the first wall and the second wall is substantially smaller than the length of the structural profile, and is for example in the range of 50 to 200 mm. The thickness of the first wall and the second wall is even smaller than its height, and is for example in the range of 0.5 to 5 mm. The panel support is discontinuous, which has several advantages. First, the fact that it is discontinuous reduces the friction induced during the sliding of the solar panel on the panel support. Mounting is made easier and faster as the solar panel slides more easily on top of the panel support of the profile. This reduces the need to perform an additional coating during manufacturing with a low-friction material such as Teflon, which ensures that the manufacturing of the profile stays simple and cost-effective. Also, the fact that the panel support is discontinuous and formed from material of the wall itself means that locally at the position of the panel support material from the wall itself is used for creating the panel support without the need for providing other material for the creation of this panel support, which reduces the overall amount of material needed to create the profile. The amount of material needed to produce the profile is reduced, and additionally a more lightweight structure is achieved when compared to a structure with a continuous panel support. Mounting is also made easier and less dangerous when operating on lighter profiles.

The spaced panel support sections formed from the material taken from the first wall or the second wall are positioned so that they do not significantly weaken the bending stiffness and the bending strength of the profile around the strong axis. In other words, this means that the resistance to bending in a plane parallel to the first wall or the second wall forming the webs of the structural profile is not significantly reduced. Furthermore the fact that the material for the panel support is taken locally from the first wall or the second wall ensures that the first wall or the second wall is still able to ascertain a structural profile with a large resistance and stiffness against vertical loads such as for example the weight of the solar panels, snow, wind, etc., as the structural profile remains a single piece structural element, with a relatively large associated moment of inertia and modulus of resistance around the strong axis. Additionally, the position of the panel support and the associated material taken from the first wall and the second wall can be easily adapted during production in function of the thickness of the solar panel, without substantially affecting the overall strength and stiffness of the structural profile.

Additionally, the first top cover and the second top cover are substantially continuous along the length direction of the profile in order to sufficiently protect the solar panel as mentioned above. The top covers are substantially continuous along the length direction and are preferably continuous along at least one width or one length of a solar panel. The fact that the top covers are substantially continuous guarantees that the solar panel continuously slides between the first or the second top cover and the corresponding panels support. The substantially continuous top covers cover the edge of the solar panel in a continuous way thereby protecting the solar panel against accumulation of water and dirt and corrosion, in order to ensure a good long term energy conversion efficiency. The top covers need to be continuous along a substantial part of the length of the structural profile, preferably along substantially the entire length of the structural profile in order to act as a suitable structural element of the profile for ensuring the required bending strength and bending stiffness of the structural profile along its strong axis.

The profile can be secured to a structure or to the ground at the position of the first base and/or the second base sections. This brings balance to the complete profile. Also, each solar panel is connected to electrical cables or wires that are adapted to conduct the converted electrical current generated by the solar panel. All the electrical cables and wires connected to the solar panel resting on a panel support can be collected between the corresponding base section and the panel support as the corresponding base section is located at a position below the first panel support. This way, the electrical cable and wires are guided and shielded, and are not lying on the ground, where they could be damaged by small animals. This increases the lifetime of the assembly of the solar panel and ensures a good conversion efficiency. Additionally, also the base sections need to be continuous along a substantial part of the length of the structural profile, preferably along substantially the entire length of the structural profile in order to act as suitable structural elements of the profile for ensuring the required bending strength and bending stiffness of the structural profile along its strong axis.

A structural profile made in one piece with two walls presents a good bending strength and stiffness against vertical loads, because of a reduced modulus of resistance and moment of inertia. The first and the second walls are substantially parallel. Alternatively, the first wall and the second walls could be inclined with respect to each other.

The structural profile is further characterized in that the plurality of spaced panel support sections are formed of material taken from the first wall or the second wall from which its corresponding first or second top cover extends, such that this leaves an opening in this wall. This way, the solar panel is slid between the first or second top cover and the panel support on which it rests. The side of the solar panel along the direction of its thickness is parallel to the first or the second wall. The opening is formed by the operation of punching and bending the wall at the position of the panel support. The panel support is therefore formed of material of the first or the second wall itself, which reduces the weight of the profile and the amount of raw material needed to manufacture the structural profile.

The structural profile is further characterized in that the opening is positioned between the corresponding first or second top cover and the corresponding first or second base section and the height of the opening is smaller than the height of the first or second wall. The material taken for forming the panel support sections is taken from the web of the structural profile formed by the first or the second wall at a position closer to the neutral axis, and thus with a minimal impact on the resistance to bending in the plane parallel to the first or the second wall.

The structural profile is further characterized in that each of the plurality of spaced panel support sections are formed of material taken from the first or the second wall from which its corresponding top cover extends, by means of at least a partial punching operation configured to create the circumference of said opening. In the context of the invention, the expression partial punching also covers applying at least one cut to the first or the second wall and applying pressure below or above the resulting cut in order to form a lip from the material of the first or the second wall and extending from this first or the second wall. If the material of the first or the second wall is characterized by a good elasticity, the terms partial punching further cover the operation of applying pressure on the material of the first or the second wall at a given position, without need for pre-cut of the material, thereby creating a continuous lip from the material of the first or the second wall in the direction perpendicular to the length direction.

The structural profile is further characterized in that each of the plurality of spaced panel support sections are formed of material taken from the first or the second wall from which its corresponding first or second top cover extends, by means of:
 a punching operation creating the circumference of the opening and the circumference of the panel support section; and
 a subsequent bending operation configured to extend the panel support section from the first or the second wall thereby leaving the opening in the first or the second wall.

The structural profile is further characterized in that the plurality of spaced panel support sections are formed of material taken from the first or the second wall from which its corresponding first or second top cover extends, such that this does not leave an opening in this wall, by means of a deep drawing operation creating the circumference of the panel support section.

The structural profile is further characterized in that it is manufactured according to a process comprising at least a rolling step; and wherein the distance from the at least one base section to its corresponding panel support is larger than a predetermined distance, such that a roll for bending a sheet of metal can be positioned between the at least one base section and its corresponding panel support. This way, the manufacturing process is not hindered by the panel support. The metal plate can be rolled without the risk that the panel support prevents it from bending.

The structural profile is further characterized in that the distance between the first wall and said second wall is larger than a predefined distance, preferably larger than 5 mm. This way, the distance between the two vertical walls is small. As a single profile occupies a small volume, more profiles can be loaded in a given volume. This helps reducing the space needed to store several profiles together for transportation, and the related transportation costs.

The structural profile is further characterized in that the profile has a minimum profile length along the length direction of one width or one length of the solar panel. This way, the solar panel is securely held between a first or second top cover and a panel support. The top covers are continuous along the length of the profile, which ensures that the solar panel is protected along its whole width or its whole length.

According to a fourth aspect of the invention, there is provided a method of manufacturing the structural profiles of the assembly according to a first aspect of the invention, the method of manufacturing comprising the steps of:
 in a first step, providing a metal plate;
 in a second step subsequent to the first step, partially punching the metal plate at a region which will be used for forming the wall from which the corresponding top cover extends, thereby creating the circumference of the opening;
 in a third step subsequent to the second step, bending the circumference of the opening, thereby creating each of the plurality of spaced panel support sections; and
 in a fourth step subsequent to the third step, performing a roll forming operation on the metal plate for forming:
  at least one wall;
  at least one top cover;
  at least one base section; and
  the panel side section,
such that, when modifying the distance from at least one of the panel supports of the plurality of spaced panel support sections to the top cover, these steps are performed:
a modification of the position of the partial punching of the region which will be used for forming the wall in the second step of the method of manufacturing such that the position of the circumference of the opening is modified; and consequently a modification of the position of the bending of the circumference of the opening in the third step of the method of manufacturing.

Flexibility is provided to the production line of the profile. Indeed, if the thickness of the solar panels to be mounted on the profile changes, the production line can easily be adapted to take the modification into account. Only the position of the first and/or second panel support needs to be adapted so that it is formed at an upper or lower position of the first or second wall. This makes the profile compatible with any thickness of solar panel available on the market. The fact that the position of the openings and of the panel supports is pre-programmed brings flexibility to the process in order to easily adapt the position of the panel supports in function of solar panels with different thicknesses. Indeed, partially punching or punching an opening or a panel support at a different position only requires a simple reconfiguration of the matrix defining the punching pattern, for example only involving a horizontal movement of that matrix. After punching, the panel support is bent and the metal plate is consequently roll formed at different locations thereby creating a so-called flower until the shape of the flower reaches the desired shape of structural profile. It is clear that the numerous rolls being in use during the roll forming process do not require any modifications when the production needs to be adapted in function of the thickness of the solar panel.

BRIEF DESCRIPTION OF THE DRAWINGS

FIG. 1A to FIG. 1C schematically illustrate an embodiment of a structural profile comprising a single wall. FIG. 1A is a schematic cross-section of the structural profile along the AA-axis labelled in FIG. 1B, where a solar panel is slid between the first top cover and the first panel support. FIG. 1B is a schematic view of a part of the structural profile along the length direction as indicated in FIG. 1C. FIG. 1C is a schematic side view of the structural profile along the length direction.

FIGS. 10A and 10B respectively represent a front view and a perspective view of an alternative embodiment of a structural profile where panel supports are formed by partial punching.

FIGS. 12A and 12B respectively represent a front view and a perspective view of an alternative embodiment of a structural profile where panel supports are formed by deep drawing.

FIG. 17 schematically illustrates an embodiment of the consecutive roll forming steps of the manufacturing process of FIG. 16 in more detail.

FIG. 18A and FIG. 18B schematically illustrate embodiments of rolls used during some of the roll forming steps of FIG. 17.

FIG. 19A to FIG. 19D schematically illustrate an embodiment of a stop element secured on an assembly similar to that of FIG. 8 and FIG. 9 on FIG. 19A and FIG. 19C, secured on an assembly similar to that of FIG. 8 and FIG. 9 depicted in cross-section on FIG. 19D, and depicted in top view on FIG. 19B.

FIG. 20A to FIG. 20C schematically illustrate an embodiment of a grounding element secured on an assembly similar to that of FIG. 3, depicted on a side view on FIG. 20B and depicted on a side view on FIG. 20C when secured on an assembly similar to that of FIG. 3.

DETAILED DESCRIPTION OF EMBODIMENT(S)

Figure 1B:
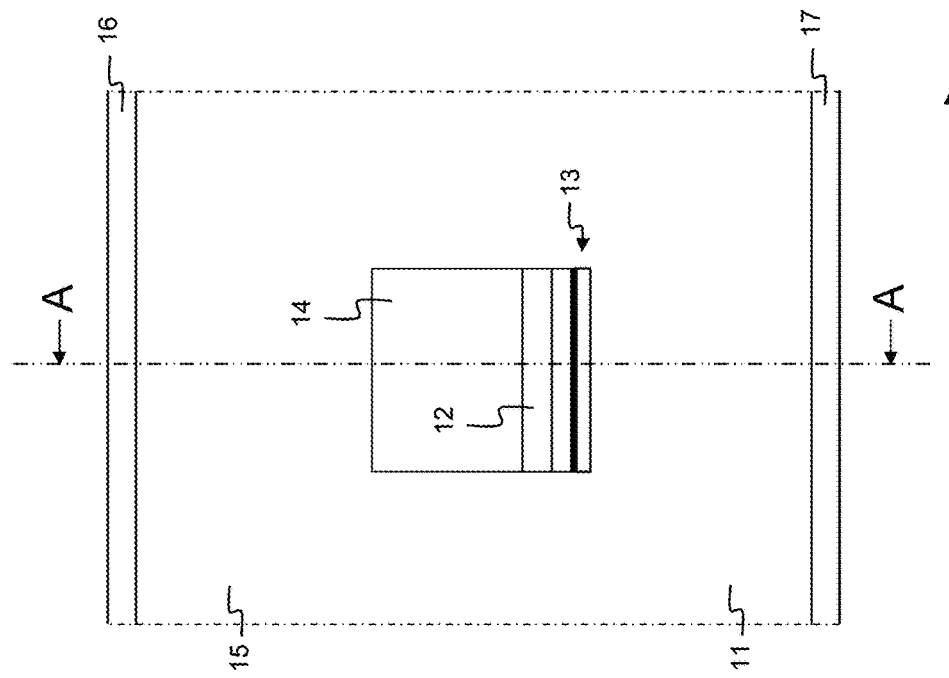
Figure 1A:
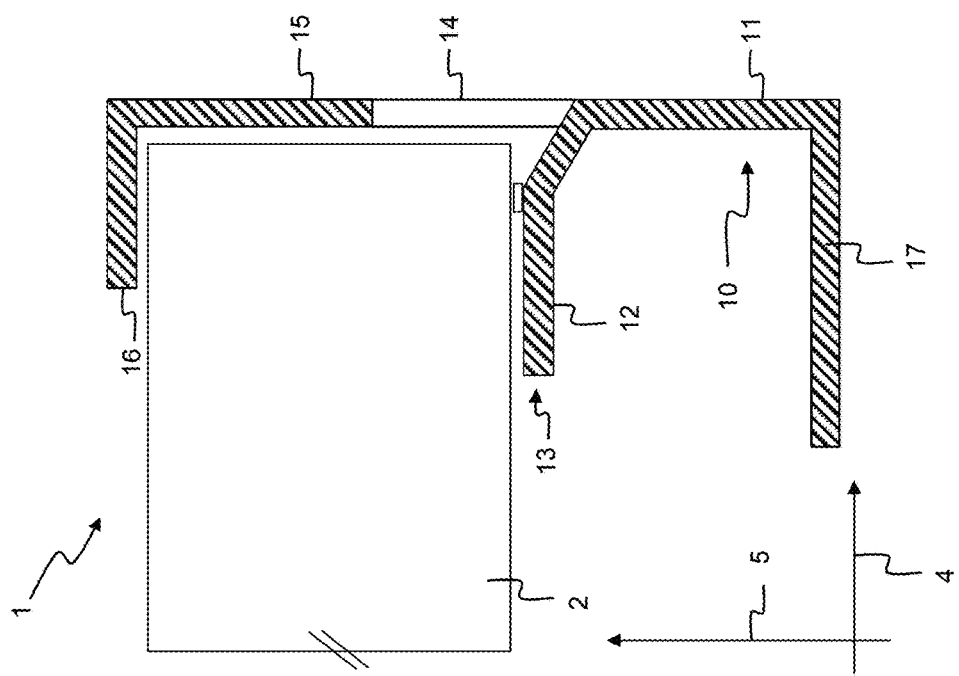

According to an embodiment shown in FIG. 1A-C, the structural profile 1 comprises a single wall 10, a panel support 13, an opening 14, a top cover 16 and a base section 17. The structural profile 1 is formed in a single metal plate, for instance aluminium or preferably steel. The height of the structural profile 1 and its wall 10 is defined along the height direction of the axis 5, and the width of the structural profile 1 is defined along the width direction of the axis 4. The wall 10 of the structural profile 1 extends substantially along a length direction 3 depicted in FIG. 1B over a distance of more than one meter, for example 6 meters or more. The height of the wall is smaller than the length of the structural profile, and is for example in the range of 50 to 200 mm. The thickness of the wall is even smaller than its height, and is for example in the range of 0.5 to 5 mm. However it is clear that alternative dimensions for the walls 10 are possible, for instance higher or lower, and thicker or thinner walls. The top cover 16 extends from the single wall 10. This means that the top cover 16 projects from the plane of the wall 10. The base section 17 also extends from the wall 10, on the same side of the wall 10 as the corresponding top cover 16, and at a position below its corresponding top cover 16. Although, as shown in the embodiment of FIG. 1A-C, the top cover 16 and base section 17 project transverse from the vertical plane of the wall 10, it is clear that alternative embodiments are possible in which the angle at which the top cover 16 and or the base section 17 project from the plane of the wall 10 at another suitable angle. As shown, the panel support 13 also extends from the wall 10 on the same side of the wall 10 as the corresponding top cover 16. The panel support 13 is positioned below the corresponding top cover 16 and above the corresponding base section 17. As the panel support 13 is positioned between the top cover 16 and the base section 17, it is also clear that the distance from the panel support 13 to the top cover 16 is smaller than the height of the wall 10. Further, as will be explained in further detail below, the distance from the base section 17 to the panel support 13 is preferably larger than a predetermined distance, such that a roll for use during the roll forming process can be positioned between the base section 17 and the panel support 13. The panel support 13 comprises a panel support section 12 formed of material taken from the wall 10. This means that for example a punching operation creates the circumference of the panel support section 12 in the material of the wall 10 and subsequently by a bending operation bends the panel support section out of the plane of the wall 10 thereby creating the panel support section 12 that extends from the wall 10 and leaving the opening 14 in the wall 10 as shown in FIG. 1A. As will be explained in further detail below, according to alternative embodiments, alternative ways for forming the panel support section 12 from material of the wall 10 exist. It is clear that the opening 14 is smaller than the height of the wall 10. Although as shown in FIG. 1 also the panel support section 12 of the panel support 13 extends substantially transverse to the vertical plane of the wall 10, it is clear that according to alternative embodiments, different angles are possible as long as in general the panel support 13 is positioned below its corresponding top cover 16 such that a solar panel 2 can be slid between the panel support 13 and its corresponding top cover 16 along the wall 10 in the length direction. When the solar panel 2 is slid between the panel support 13 and the corresponding top cover 16 along the wall 10 and along the length direction 3, the section of the wall 10 between the top cover 16 and the opening 14 forms a panel side section 15 which guides the solar panel 2 during sliding. The wall 10 between the base section 17 and the panel support 13 forms a spacer 11, where for example mounting means for mounting the structural profile to an assembly or electrical cables connected to the solar panel 2 can be provided and protected from harsh weather conditions.

As clearly shown in FIG. 1B which is a detailed view of fragment B in FIG. 1C, the panel support 13 of this embodiment is discontinuous along the length direction 3. This means that the panel support 13 comprises a plurality of panel support sections 12 formed of material taken from the wall 10 spaced along the length direction 3. As further shown, both the top cover 16 and the base section 17 are substantially continuous along said length direction 3 of the wall 10. The top cover 16 and the base section 17 are preferably continuous along at least one width or one length of a solar panel, and need to be continuous along a substantial part of the length of the structural profile, preferably along substantially the entire length of the structural profile in order to act as a suitable structural element of the profile for ensuring the required bending strength and bending stiffness of the structural profile along its strong axis. As shown in FIG. 1C, the structural profile 1 thus comprises a plurality of panel support sections 12 formed of material taken from the wall 10 from which its corresponding top cover 16 extends, the panel support sections 12 being spaced along the length direction 3 and arranged at substantially the same height along the wall 10. The panel support 13 is therefore discontinuous along the length direction 3. The fragment B shown in FIG. 1B is periodically repeated along the length direction 3 of the wall 10 of the structural profile 1 as shown in FIG. 1C. According to an alternative embodiment, the fragment B can be repeated following a non-periodic pattern along the length direction 3 of the wall 10 of the structural profile 1. In other words, the distance between two adjacent panel support sections 12 can vary along the length direction 3 of the wall 10 of the structural profile 1.

It is clear that in this way the structural profile 1 forms a structural profile in which the continuous top cover 16 and base section 17 from the flanges and the single wall 10 forms the web. The continuous base section and top cover, which are arranged at both sides relatively far from the neutral axis of the structural profile in this way enable a moment of inertia that enables a good resistance to bending in the plane parallel to the wall 10 which forms the web, to withstand for example the loads induced by the weight of the solar panels, snow, wind, etc. The material taken for forming the panel support sections is taken from the web of the structural profile 1 which is formed by the wall 10. As shown, the material is taken at a position close to the neutral axis, and thus with a minimal impact on the resistance to bending in the plane parallel to the wall 10 which forms the web of the structural profile 10. In other words, taking material close to the neutral axis has a minimal impact on the bending stiffness and the bending strength around the strong axis of the structural profile 1, as the moment of inertia is largely determined in function of the height of the web formed by the first wall 10 and the width of the flanges formed by the continuous top cover 16 and the continuous base section 17.

Figure 2:
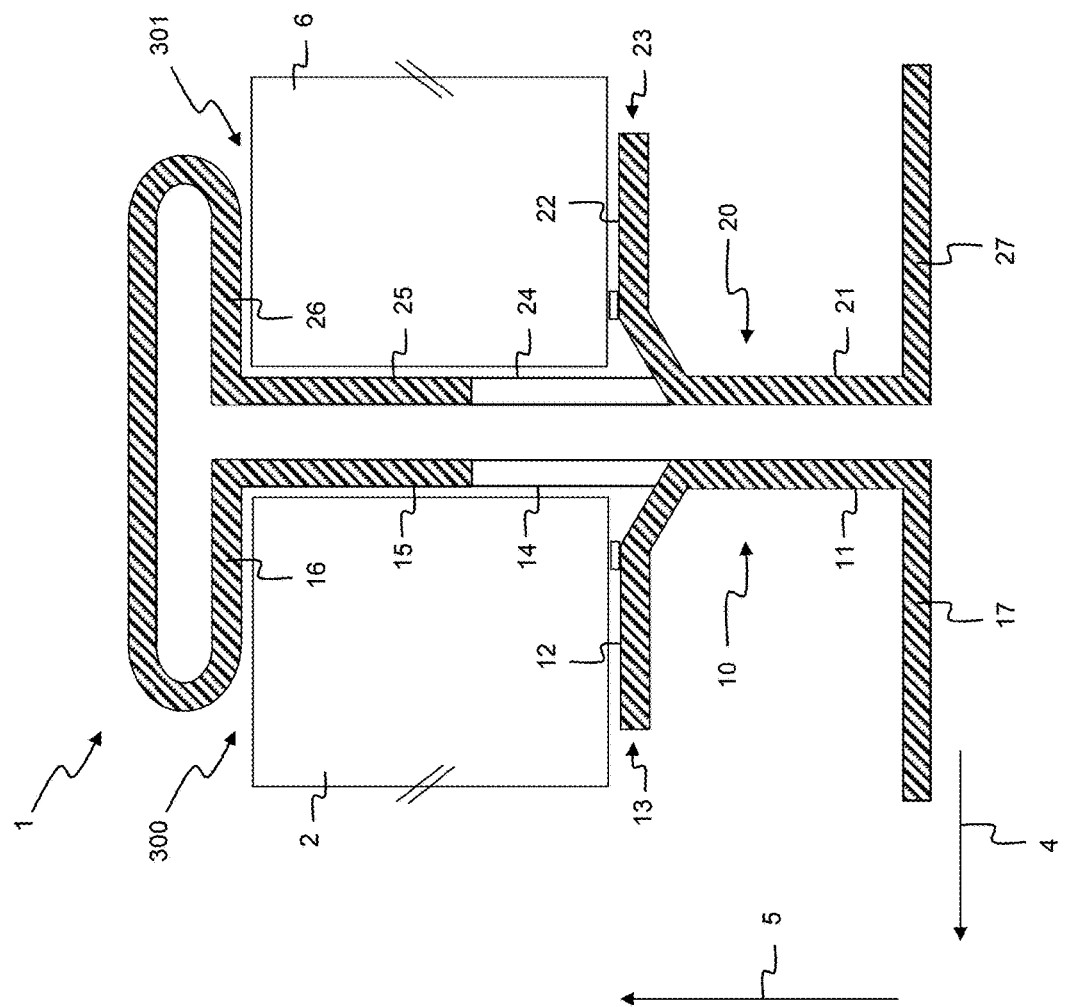
FIG. 2 schematically illustrates a cross-section of an alternative embodiment of a structural profile along a plane perpendicular to the length direction, where the structural profile comprises two walls, two coupled top covers, two base sections and two panel supports on which two solar panels rest.

According to an embodiment shown in FIG. 2, the structural profile 1 comprises a first wall 10 from which a first top cover 16 and its corresponding first base section 17 and its corresponding panel support 13 extend. The structural profile 1 further comprises a second wall 20 from which at least a second top cover 26 and its corresponding second base section 27 and its corresponding second panel support 23 extend in a direction opposite to the width direction 4. The height of the structural profile 1 and its first wall 10 and its second wall 20 is defined along the height direction of the axis 5, and the width of the structural profile 1 is defined along the width direction of the axis 4. The structural profile 1 is formed in a single metal plate, for instance aluminium or preferably steel. The first wall 10 and the second wall 20 of the structural profile 1 extend substantially along a length direction 3 depicted in FIG. 1C over a distance of more than one meter, for example 6 meters or more. The height of the first wall 10 and of the second wall 20 is smaller than the length of the structural profile 1, and is for example in the range of 50 to 200 mm. The thickness of the first wall 10 and of the second wall 20 is even smaller than its height, and is for example in the range of 0.5 to 5 mm. However it is clear that alternative dimensions for the first wall 10 and the second wall 20 are possible, for instance higher or lower, and thicker or thinner walls. The top covers 16, 26 extend respectively from the first wall 10 and from the second wall 20. This means that the top covers 16, 26 project respectively from the plane of the first wall 10 and from the plane of the second wall 20. The base sections 17, 27 also extend respectively from the first wall 10, on the same side of the first wall 10 as the corresponding top cover 16 and at a position below its corresponding top cover 16, and from the second wall 20, on the same side of the second wall 20 as the corresponding top cover 26 and at a position below its corresponding top cover 26. Although, as shown in the embodiment of FIG. 1C, the top covers 16, 26 and base sections 17, 27 project transverse respectively from the vertical plane of the first wall 10 and from the vertical plane of the second wall 20, it is clear that alternative embodiments are possible in which the angle at which the top covers 16, 26 and or the base sections 17, 27 project respectively from the plane of the first wall 10 and the second wall 20 at another suitable angle. As shown, the panel supports 13, 23 also extend respectively from the first wall 10 and the second wall 20 on the same side of the first wall 10 and the second wall 20 as the corresponding top covers 16, 26. The panel supports 13, 23 are positioned below the corresponding top covers 16, 26 and above the corresponding base sections 17, 27. As shown in FIG. 2, the panel supports 13, 23 are positioned at the same height and respectively extend from the first and the second wall 10, 20, and are also opposite to each other along the width direction 4. As the panel supports 13, 23 are positioned between the top covers 16, 26 and the base sections 17, 27 it is also clear that the distance from the panel support 13 to the top cover 16 is smaller than the height of the first wall 10 and that the distance from the panel support 23 to the top cover 26 is smaller than the height of the second wall 20. Further, as will be explained in further detail below, the distance from the base sections 17, 27 to the respective panel supports 13, 23 is preferably larger than a predetermined distance, such that a roll for use during the roll forming process can be positioned between the base sections 17, 27 and the respective panel supports 13, 23. The panel supports 13, 23 comprise a panel support section 12, 22 formed of material taken respectively from the first wall 10 or from the second wall 20. This means that for example a punching operation creates the circumference of the panel support sections 12, 22 respectively in the material of the first wall 10 and the second wall 20 and subsequently by a bending operation bends the panel support section out of the plane of respectively the first wall 10 and the second wall 20 thereby creating the panel support section 12, 22 that extends from the first wall 10 and the second wall 20 and respectively leaving the openings 14, 24 in the first wall 10 and the second wall 20 as shown in FIG. 2. As will be explained in further detail below, according to alternative embodiments, alternative ways for forming the panel support sections 12, 22 from material of the first wall 10 and the second wall 20. It is clear that the openings 14, 24 are smaller than the respective height of the first wall 10 and the second wall 20. Although as shown FIG. 2 also the panel support sections 12, 22 of the panel supports 13, 23 extend substantially transverse respectively to the vertical plane of the first wall 10 and of the second wall 20, it is clear that according to alternative embodiments, different angles are possible as long as in general the panel supports 13, 23 are positioned below their corresponding top covers 16, 26 such that a solar panel 2 can be slid between the panel support 13 and its corresponding top cover 16 along the first wall 10 in the length direction and such that a solar panel 6 can be slid between the panel support 23 and its corresponding top cover 26 along the second wall 20 in the length direction. When the solar panel 2 is slid between the panel support 13 and the corresponding top cover 16 along the first wall 10 and along the length direction 3, the section of the first wall 10 between the top cover 16 and the opening 14 forms a panel side section 15 which guides the solar panel 2 during sliding. When the solar panel 6 is slid between the panel support 23 and the corresponding top cover 26 along the second wall 20 and along the length direction 3, the section of the second wall 20 between the top cover 26 and the opening 24 forms a panel side section 25 which guides the solar panel 6 during sliding. The first wall 10 between the base section 17 and the panel support 13 forms a spacer 11, where for example mounting means for mounting the structural profile to an assembly or electrical cables connected to the solar panel 2 can be provided and protected from harsh weather conditions. The second wall 20 between the base section 27 and the panel support 23 forms a spacer 21, where for example mounting means for mounting the structural profile to an assembly or electrical cables connected to the solar panel 6 can be provided and protected from harsh weather conditions. Therefore, an edge 300 of the solar panel 2 is secured below the first top cover 16, and an edge 301 of the solar panel 6 is secured below the second top cover 26.

As clearly shown in FIG. 2, both the top covers 16, 26 and the base sections 17, 27 are substantially continuous along said length direction 3 of respectively the first wall 10 and the second wall 20. The top covers 16, 26 and the base sections 17, 27 are preferably continuous along at least one width or one length of a solar panel, and need to be continuous along a substantial part of the length of the structural profile 1, preferably along substantially the entire length of the structural profile 1 in order to act as a suitable structural element of the profile 1 for ensuring the required bending strength and bending stiffness of the structural profile 1 along its strong axis. As shown in FIG. 1C, the structural profile 1 thus comprises a plurality of panel support sections 12 formed of material taken from the first wall 10 from which its corresponding top cover 16 extends, the panel support sections 12 being spaced along the length direction 3 and arranged at substantially the same height along the first wall 10. The panel support 13 is therefore discontinuous along the length direction 3. The fragment B shown in FIG. 9B is periodically repeated along the length direction 3 of the first wall 10 of the structural profile 1 as shown in FIG. 1C. According to an alternative embodiment, the fragment B can be repeated following a non-periodic pattern along the length direction 3 of the first wall 10 of the structural profile 1. In other words, the distance between two adjacent panel support sections 12 can vary along the length direction 3 of the first wall 10 of the structural profile 1 and the distance between two adjacent panel support sections 22 can vary along the length direction 3 of the second wall 20 of the structural profile 1.

It is clear that in this way the structural profile 1 forms a structural profile in which the continuous top covers 16, 26 and base sections 17, 27 from the flanges and the first wall 10 and the second wall 20 form the web. The continuous base section and top cover, which are arranged at both sides relatively far from the neutral axis of the structural profile in this way enable a moment of inertia that enables a good resistance to bending in the plane parallel to the first wall 10 and the second wall 20 which form the web, to withstand for example the loads induced by the weight of the solar panels, snow, wind, etc. The material taken for forming the panel support sections is taken from the web of the structural profile 1 which is formed respectively by the first wall 10 and the second wall 20. As shown, the material is taken at a position close to the neutral axis, and thus with a minimal impact on the resistance to bending in the plane parallel to the first wall 10 and the second wall 20 which form the web of the structural profile 1. In other words, with a minimal impact on the bending stiffness and the bending strength around the strong axis of the structural profile 1, as the moment of inertia is largely determined in function of the height of the web formed by the first wall 10 and the second wall 20 and the width of the flanges formed by the respective continuous top covers 16, 26 and the respective continuous base section 17, 27.

According to this embodiment the panel support sections 12, 22 were formed from material of the corresponding walls 10, 20 by means of a punching operation that created the circumference of the panel support section 12, 22 and was followed by a bending operation configured to extend the panel support section 12, 22 from the wall 10, 20 by bending the panel support section 12, 22 out of the plane from the corresponding wall 10, 20 to the position shown, thereby leaving the opening 14, 24 in the wall 10, 20. As shown, these openings 14, 24 are smaller than the height of the corresponding wall 10, 20. As further shown the second wall 20 is substantially parallel to the first wall 10 and positioned on the opposite side of the first top cover 16. The first top cover 16 is coupled to the second top cover 26. In other words, as shown, the first and the second top covers 16, 26 can be directly connected to each other or according to alternative embodiments can be coupled to each other through an intermediate element. The walls 10, 20 between the top cover 16, 26 and the opening 14, 24 form a panel side section 15, 25 which guides the solar panel 2, 6 during sliding. The walls 10, 20 between the base section 17, 27 and the panel support 13, 23 form a spacer 11, 21, where for example mounting means or electrical cables connected to the solar panels can be provided and protected from harsh weather conditions. Although, as shown, the base sections 17, 27 are not connected, according to an alternative embodiment, the first and the second base sections 17, 27 can be coupled to each other, which means that they can be directly connected to each other, or connected through an intermediate element such as for example a structure on which they are fixedly mounted. It is clear that in this way the structural profile 1 forms a profiled box beam, also known as box girder or tubular girder, which has all the same advantages as the structural profile, as will be explained in further detail below with reference to FIGS. 13 and 14, and additionally has an increased resistance against torsional loading, to withstand for example torsional loads that for example occur during the insertion of solar panels.

Figure 3:
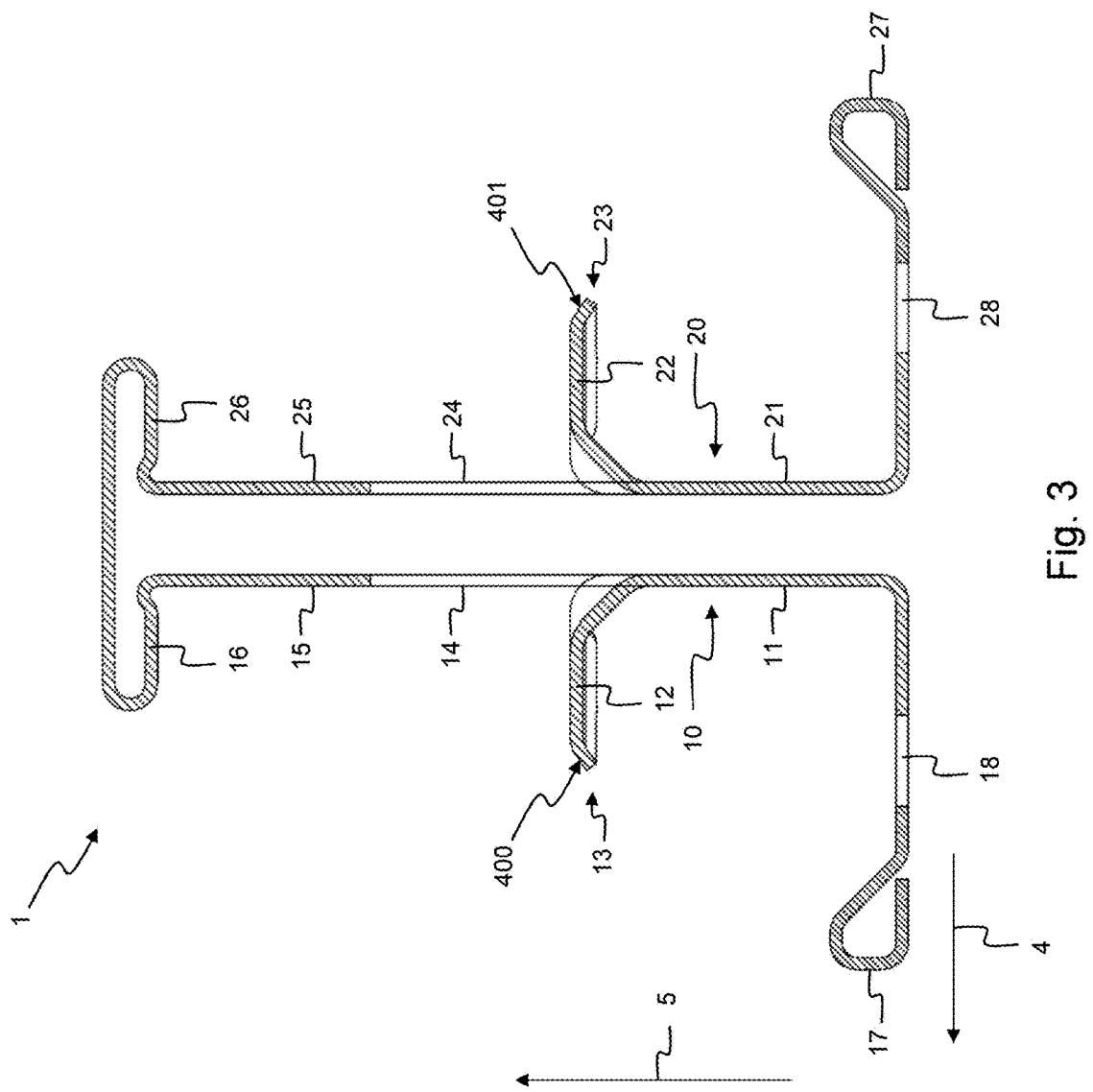
FIG. 3 is a schematic cross-section of a further embodiment of a structural profile similar to that of FIG. 2 along a plane perpendicular to the length direction.

According to a further embodiment shown in FIG. 3, similar to that of FIG. 2, the structural profile 1 comprises a first wall 10 from which a continuous first top cover 16 and its corresponding continuous first base section 17 and its corresponding discontinuous panel support 13 extends. The structural profile 1 further comprises a second wall 20 from which at least a continuous second top cover 26 and its corresponding continuous second base section 27 and its corresponding discontinuous second panel support 23 extend. As shown they extend from the second wall 20 at the opposite side as the side of the wall 10 from which the first top cover 16 extends. As shown, similarly as in the previous embodiments the structural profile 1 is formed in a single metal plate, for instance aluminium or preferably steel, in which the spaced panel support sections 12 of the panel support are formed, for example by means of a punching operation that created the circumference of the panel support section 12 and was followed by a bending operation to extend the panel support section 12 from the wall 10 thereby leaving the opening 14 in the wall 10. As shown, the height of the opening 14 is smaller than the height of the wall 10, preferably the height of the opening is smaller than for example 50%, preferably smaller than 30% of the height of the wall 10. As further shown, the second wall 20 is substantially parallel to the first wall 10 and positioned on the opposite side of the first wall 10 than that side from which its first top cover 16 extends. The first top cover 16 is coupled to the second top cover 26. In other words, as shown, as the first top cover 16 and second top cover 26 are formed from a single sheet of metal they are directly connected. It is clear that alternative embodiments are possible in which the first and the second top covers 16, 26 can be directly connected to each other, or according to still further alternative embodiments they can be coupled to each other through an intermediate element, such as for example a suitable cap continuously covering the first and second top covers 16, 26. The wall 10 between the top cover 16 and the opening 14 forms a panel side section 15 which guides a solar panel during sliding. The wall 10 between the base section 17 and the panel support 13 forms a spacer 11, where electrical cables connected to the solar panels are grouped and protected from harsh weather conditions along the length direction 3. Similarly, the wall 20 presents a panel side section 25, which guides a solar panel during sliding, and a spacer 21, which guides and protects electrical cables. According to an alternative embodiment, the first and the second base sections 17, 27 can be coupled to each other, which means that they can be directly connected to each other, or connected through an intermediate element. For example, by means of the openings 18 and 28, which are respectively provided in the base sections 17 and 27, the structural profile 1 can be fixed to a structure or to the ground, depicted as element 7 of FIG. 4 and FIG. 5, using screws or clips fitting in the openings 18 and 28 of the first and second base sections 17, 27, thereby coupling the base sections 17, 27. As further shown, it is clear that according to this embodiment the first and the second panel supports 13, 23 are positioned at the same height on respectively the first and the second wall 10, 20, and are also opposite to each other along the direction 4, thereby making them suitable for use in an assembly for mounting solar panels with substantially the same thickness.

Figure 4:
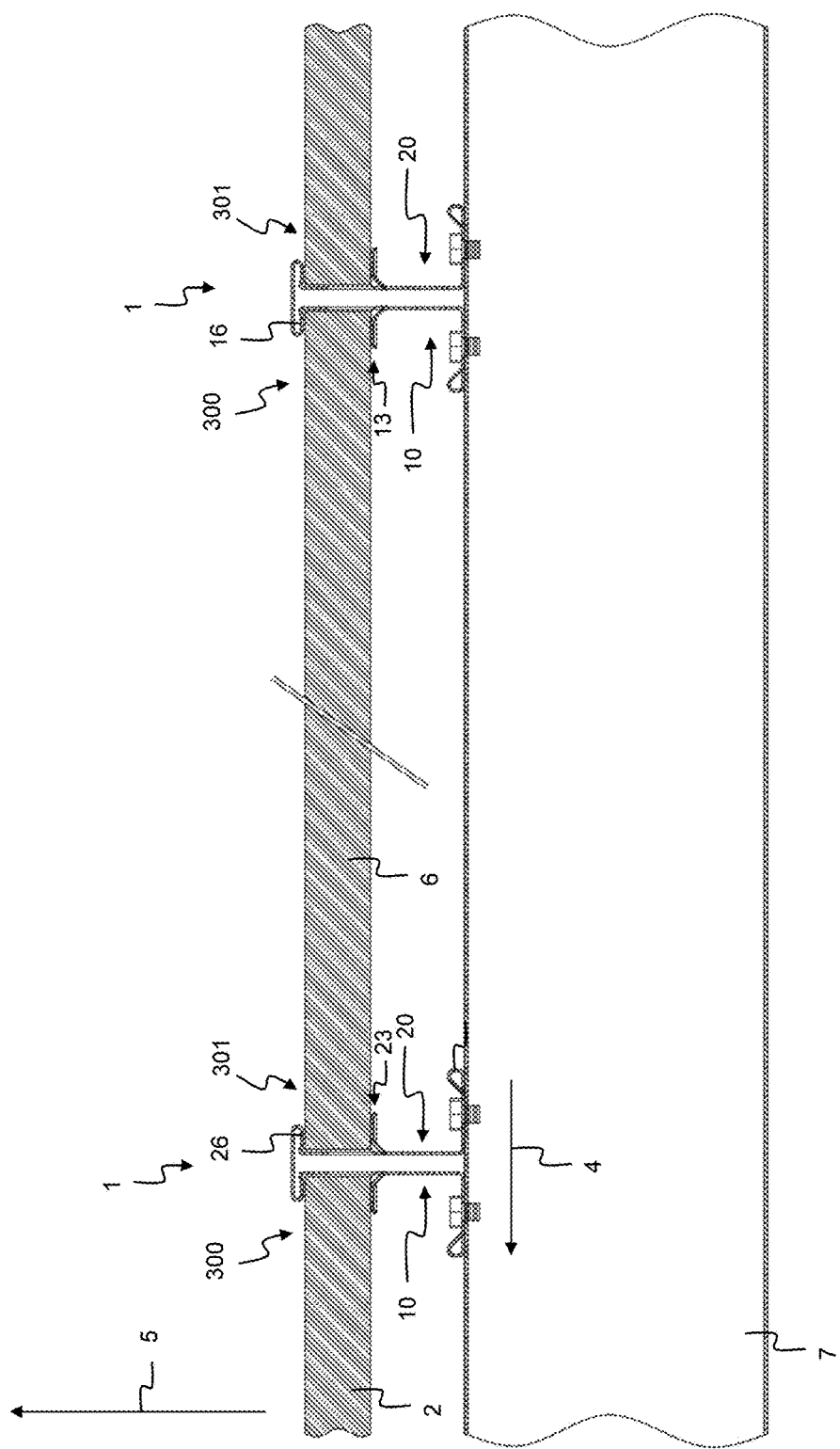
FIG. 4 is a schematic cross-section along a plane perpendicular to the length direction of an embodiment of an assembly comprising a plurality structural profiles similar to the structural profile depicted in FIG. 3, and solar panels that are secured in between two structural profiles.

According to an embodiment shown in FIG. 4, an assembly is provided comprising a plurality of structural profiles 1 comprising a first wall 10 and a second wall 20 according to the embodiment described in FIG. 3. Two structural profiles 1 are shown, which are secured on an element 7, which can be for instance a frame structure or the ground, with screws and bolts inserted in the openings 18 and 28 of the first and second base sections 17, 27, thereby coupling these base sections of the profiles 1. As shown, a solar panel 2, which was slidably mounted along the length direction 3, is secured between the first top cover 16 and the first panel support 13 of one structural profile 1. A solar panel 6 is secured between the second top cover 26 and the second panel support 23 of the structural profile 1 at its left side 301, and between the first top cover 16 and the first panel support 13 of another structural profile 1 at its right side 300. Thereby, the edge 301 of the solar panel 6 is covered with the second top cover 26 of one structural profile 1, while the opposite edge 301 of the same solar panel 6 is covered by the first top cover 16 of the other structural profile 1.

Figure 5:
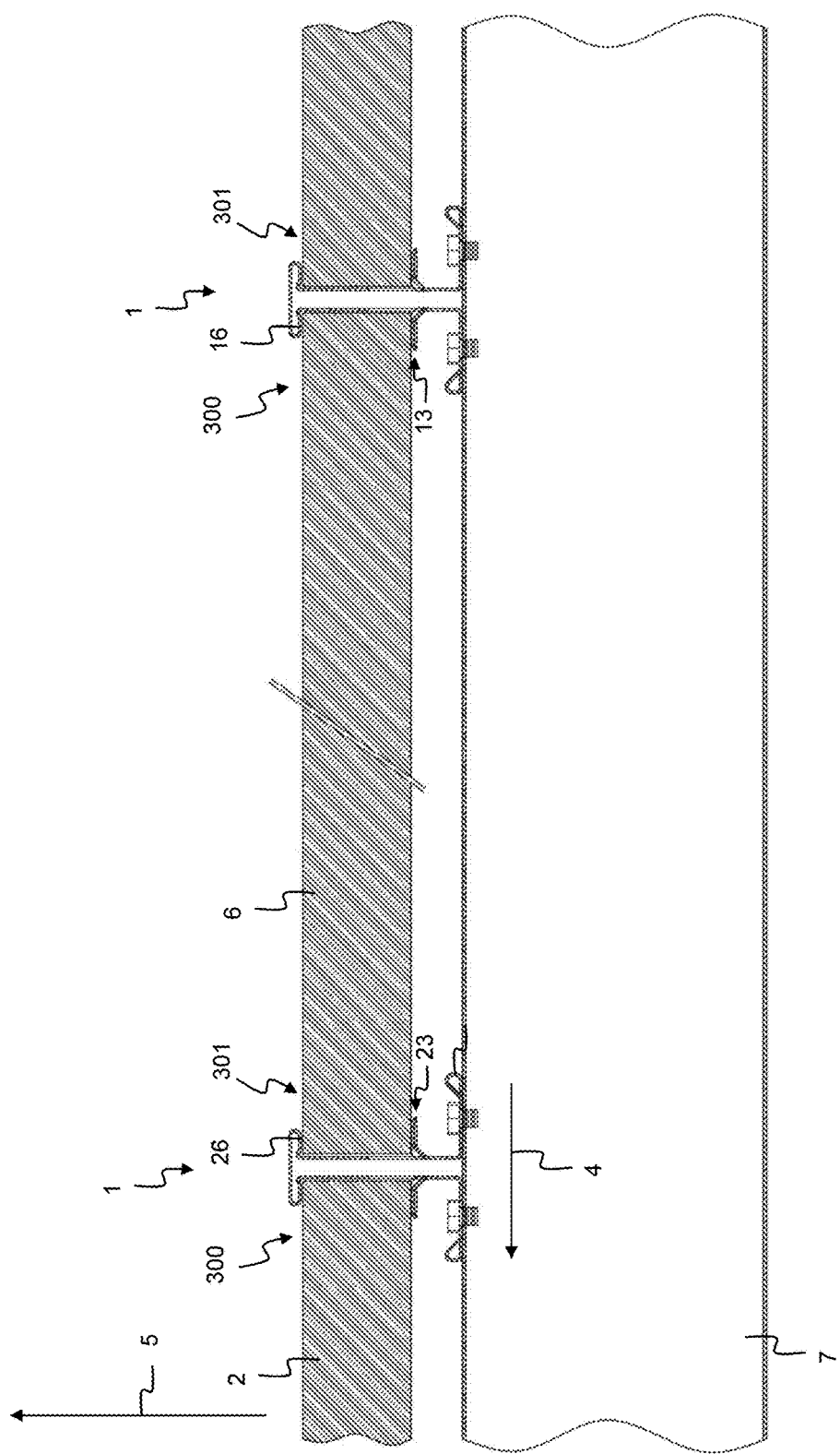
FIG. 5 is a schematic cross-section along a plane perpendicular to the length direction of an embodiment of an assembly similar to that of FIG. 4, comprising a plurality of structural profiles similar to the structural profile depicted in FIG. 3, and solar panels with a thickness larger than the ones depicted in FIG. 4 that are secured in between two structural profiles.

According to an alternative embodiment of such an assembly shown in FIG. 5, two structural profiles 1 similar to the ones depicted in FIG. 4 secure a solar panel 6 in a similar way, however, the solar panel 6 is in this case thicker than the solar panel 6 depicted in FIG. 4. Therefore, the distance between the first top cover 16 and the first panel support 13, as well as the distance between the second top cover 26 and the second panel support 23 are adapted and made larger in order to secure the thicker solar panel 6. As a consequence, the distance between the first panel support 13 and the first base section 17 as well as the distance between the second panel support 23 and the second base section 27 are smaller than the ones depicted in FIG. 4. However, these latter distances remain large enough for a roll used for bending a sheet of metal 100 to be positioned between the base sections 17, 27 and the corresponding panel supports 13, 23 and for providing access to the mounting means for securing the structural profiles 1 on the frame structure 7 before the solar panels are slid in.

Figure 6:
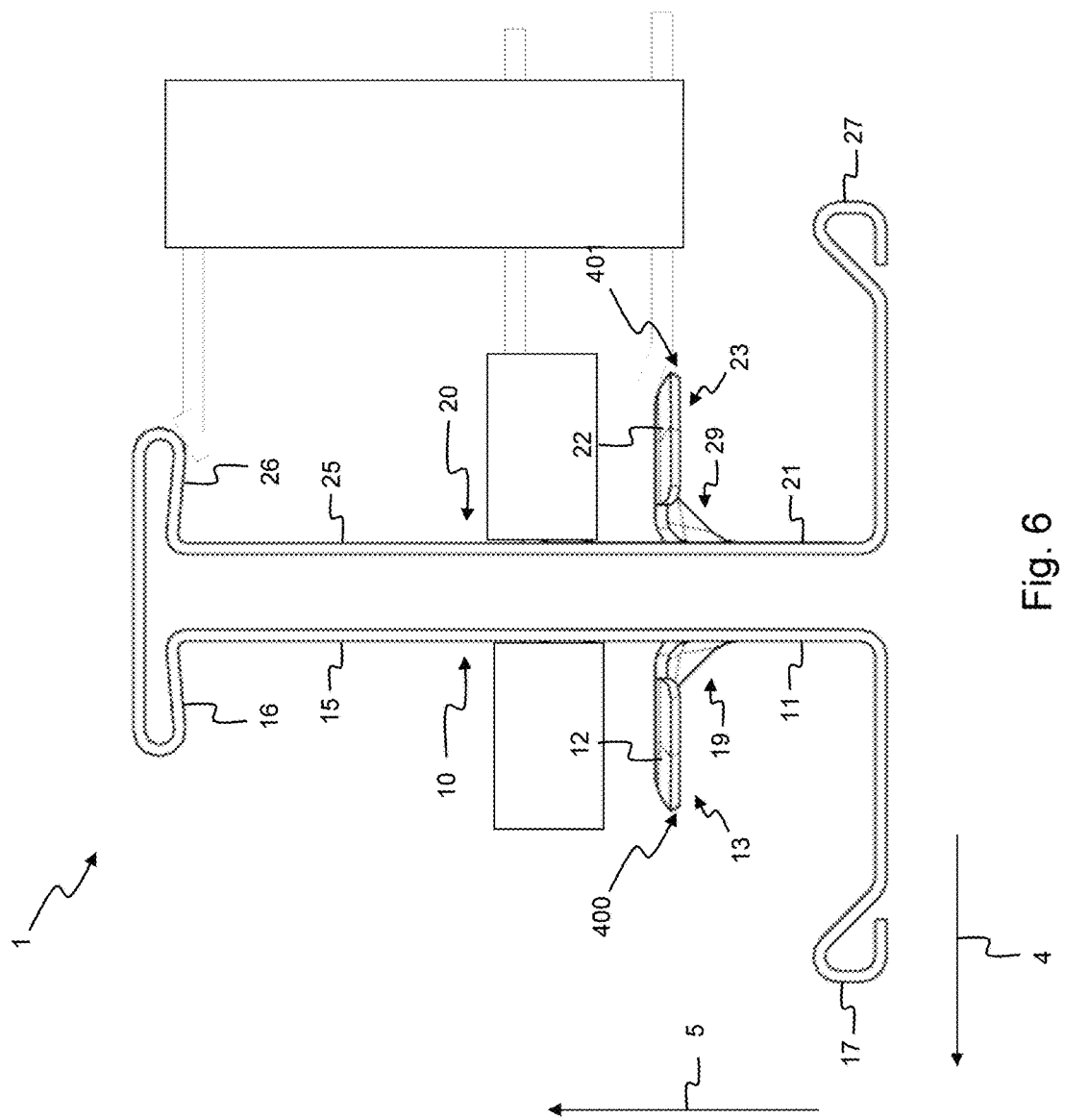
FIG. 6 is a schematic front view along the length direction of a further embodiment of a structural profile similar to the one depicted in FIG. 3.
Figure 7:
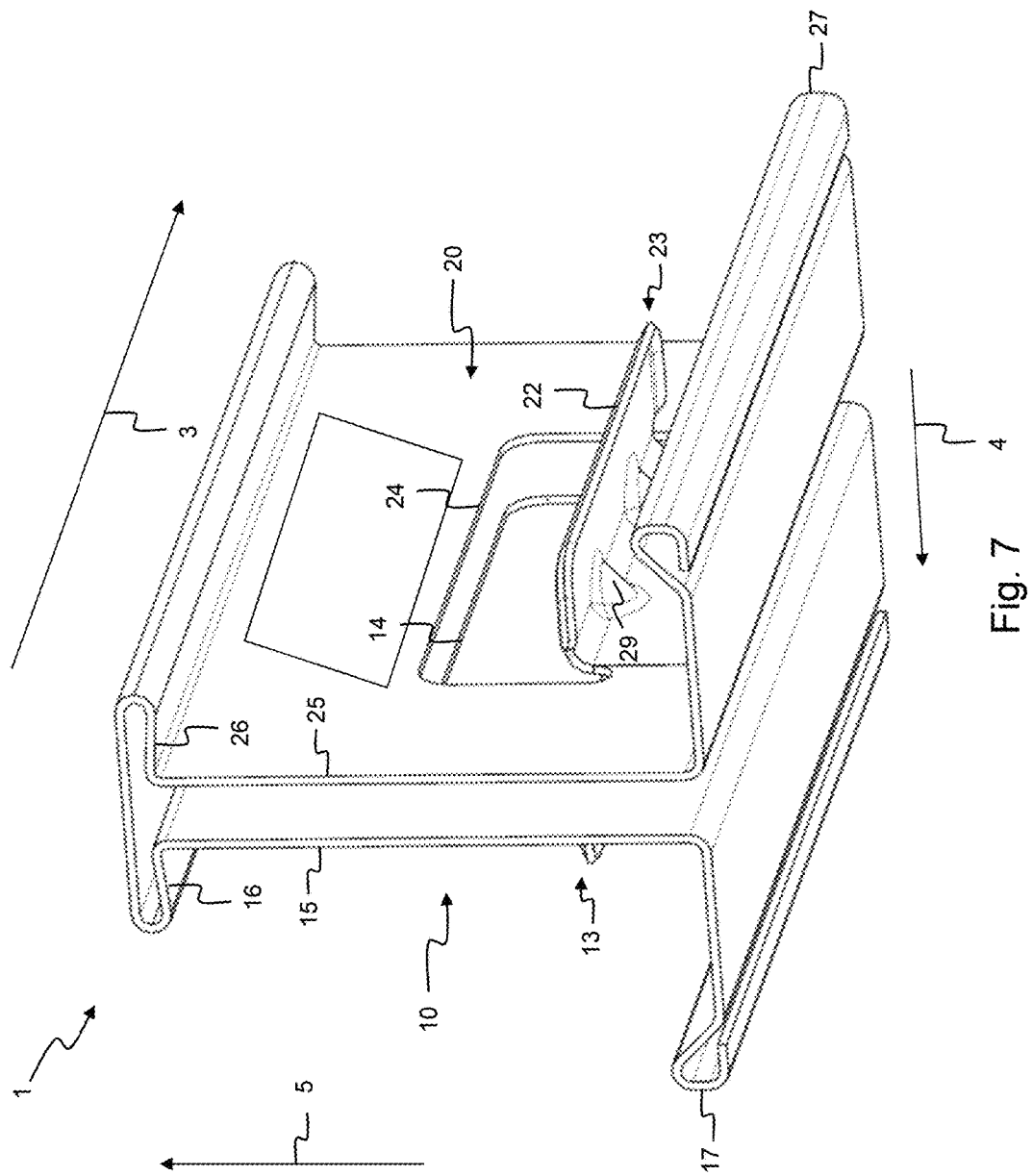
FIG. 7 is a perspective view of the embodiment of the structural profile of FIG. 6.

According to an embodiment shown in FIGS. 6 and 7, a structural profile 1 is provided similar to the one depicted in FIG. 3. Also this structural profile 1 is formed in a single metal plate, for instance aluminium or preferably steel. FIG. 6 shows a front view perpendicular to the length direction 3, which clearly shows that the walls 10, 20 extends continuously along its entire height, which is also the case at positions along the length direction 3 in between two consecutive panel side sections 12, 22. The first and second panel supports 13, 23 are not continuous along the direction of the walls. As explained above, with reference to FIGS. 4 and 5, the first and second panel supports 13, 23 of a structural profile 1 can be positioned at different vertical heights on the first and the second walls 10, 20 during production in order to adapt the structural profile 1 to secure solar panels with different thicknesses. As further shown support elements 19, 29 are formed on the first and the second panel supports 13, 23. They are formed as a local indentation that respectively extends from the first and the second wall 10, 20 and the first and second panel support section 12, 22 such that their linear bending axis is interrupted by these indentations in a way that increases resistance to torsion around this axis under the influence of the load applied by the solar panels as a consequence of their weight, snow and wind loads, etc. As further shown, according to this embodiment, the panel support sections 12, 22 are angled down by means of a bent over lip 400, 401 along the circumference of their edges in order to smoothen their edges. This facilitates the operation of sliding of the solar panels along the wall 10.

FIG. 7 shows a perspective view of the embodiment of FIG. 6. As shown, the support elements 19, 29 of the panel supports 13, 23 are located under the panel support sections 12, 22 and form an indentation that disrupts the linear bending axis with the wall 10, 20. The first and the second panel supports 13, 23 are positioned at the same height on respectively the first and the second wall 10, 20, and are also opposite to each other along the direction 4. Similar as in the previous embodiments the first and second panel supports 13, 23 are thus not continuous along the length direction 3, while the top covers 16, 26 and base sections 17, 27 are continuous.

Figure 8:
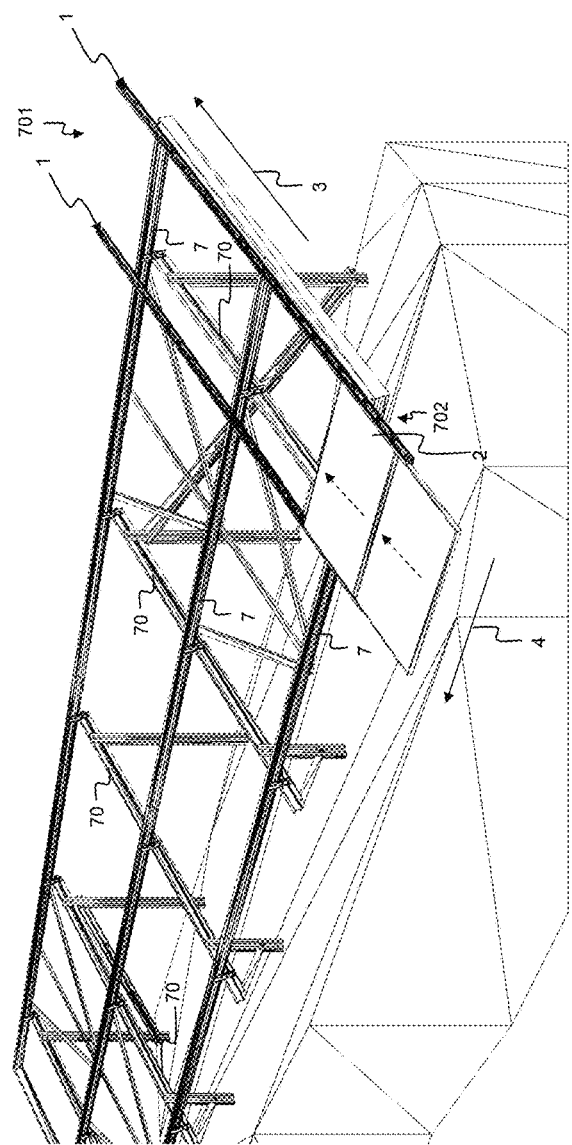
FIG. 8 schematically illustrates a further embodiment of an assembly comprising a plurality of structural profiles according to the embodiment of FIG. 6 which are mounted parallel on a structure such that solar panels can be mounted by sliding them in landscape orientation along the length direction, during the mounting operation.

According to an embodiment of an assembly shown in FIG. 8, a plurality structural profiles 1 are mounted parallel to each other along their length direction 3 on a frame structure comprising a plurality of longitudinal transverse elements 7. These transverse elements 7 also extending parallel to each other and extending substantially transverse to the length direction 3. As shown the structural profiles 1 and the transverse elements 7 thus form a frame structure that is supported on still further support elements 70 that extend substantially in parallel to each other along the length direction 3, for mounting this frame structure to the ground and to provide the frame structure with a suitable inclination for the solar panels. As shown, according to this embodiment, the distance separating the plurality of structural profiles 1 is adapted such that a solar panel 2 can be slid along the length direction 3 in landscape orientation with respect to the width direction 4 and can be secured between two structural profiles 1. Although only two such structural profiles 1 are shown it is clear that any suitable plurality of structural profiles can be arranged along the width direction 4 spaced at about the same distance substantially corresponding to the width of the solar panels. It is clear that such an orientation is advantageous as in this way a maximum area can be covered by the solar panels with a minimum of structural profiles 1 as in landscape direction the distance between the parallel structural profiles will be larger than in portrait orientation. However such an orientation of the solar panels requires sufficient stiffness of the structural profiles as the distance between support points for these structural profiles along the length direction, which according to this embodiment is the distance between the parallel transverse elements 7, as shown, is preferably larger than the width of the solar panels and thus structural stiffness and strength is no longer provided by the solar panels themselves. In this way according to this embodiment a predetermined area for the solar panels can be provided by the frame comprising of a minimal number of parallel structural profiles 1 and transverse longitudinal elements 7, while still providing the required structural stiffness and strength.

Figure 9:
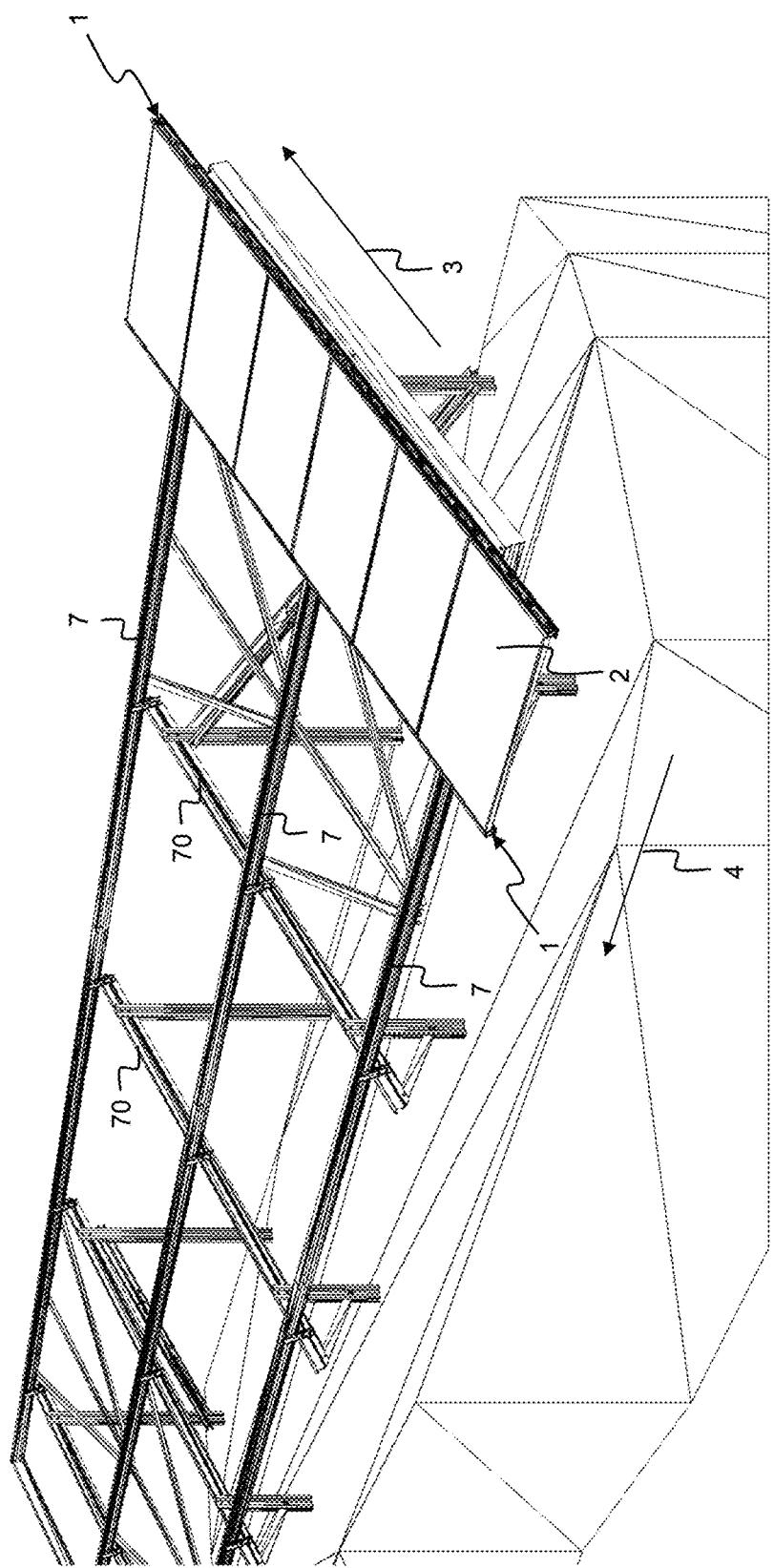
FIG. 9 schematically illustrates the embodiment of FIG. 8 during a further step of the mounting operation in which six solar panels in landscape orientation are secured after being mounted by sliding them in between two structural profiles.

FIG. 9 shows the same embodiment of the assembly as FIG. 8, in which a plurality of structural profiles 1 are adapted on a frame structure 7 and are positioned parallel to each other. As shown six solar panels 2 have now been secured after sliding them along the length direction 3 in landscape orientation with respect to the width direction 4 and can be secured between the two structural profiles 1. As shown, two structural profiles 1 are adapted on the frame structure 7 and are parallel to each other. It is clear that in a modular way, three, four, five, six, seven, eight, nine, ten, or any other suitable plurality of structural profiles 1 can be positioned parallel to each other on a suitable frame structure 7. In between each of such adjacent parallel structural profiles 1 further rows of a solar panels 2 can then be provided. Each row of solar panels 2 could similarly be mounted as explained with reference to FIGS. 8 and 9, by sliding them sequentially along the length direction 3, in landscape orientation with respect to the width direction 4, in between the respective two adjacent structural profiles 1.

According to still a further embodiment shown in FIGS. 10A and 10B, a structural profile 1 similar to the embodiment of FIG. 3 is provided, where a plurality of panel support sections 12, 22 are formed according to alternative manufacturing technique. The panel supports 13, 23 are obtained by partial punching, i.e. applying at least one cut to the wall 10, 20 and applying pressure below or above the resulting cut in order to form a lip from the material of the wall 10, 20 and extending from this wall 10, 20, thereby creating the opening 14, 24. If the material of the wall 10, 20 is characterized by a good elasticity, the terms partial punching further also cover the operation of applying pressure on the material of the wall 10, 20 at a given position, without need for pre-cut of the material, thereby creating a continuous lip from the material of the wall 10, 20 in the direction perpendicular to the length direction 3.

Figure 11B:
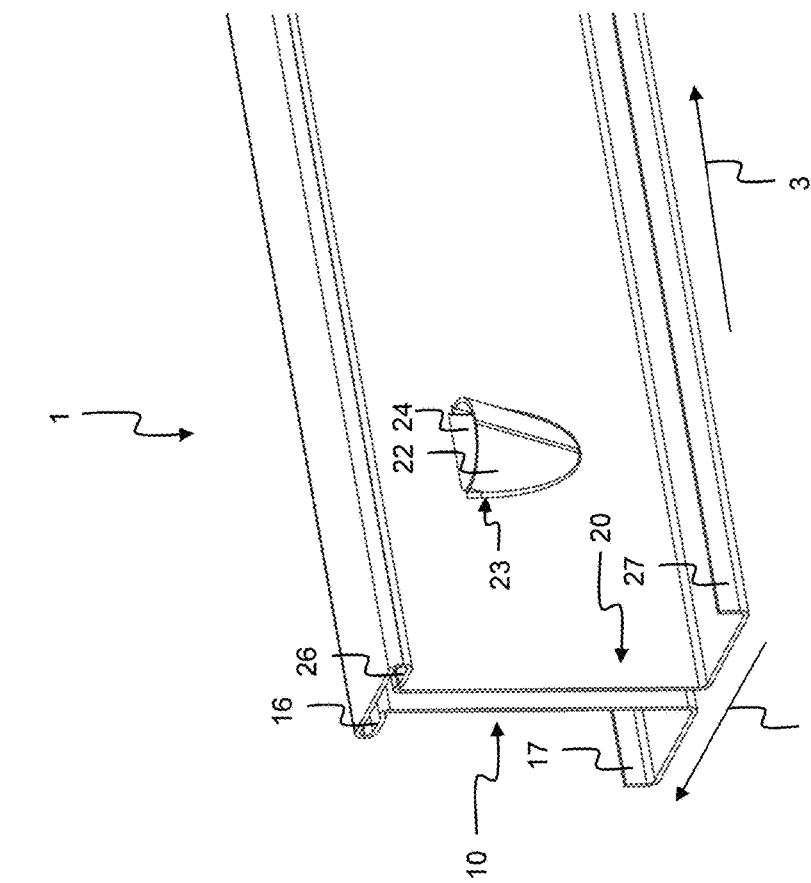
FIGS. 11A and 11B respectively represent a front view and a perspective view of an alternative embodiment of a structural profile where panel supports are formed by partial punching.
Figure 11A:
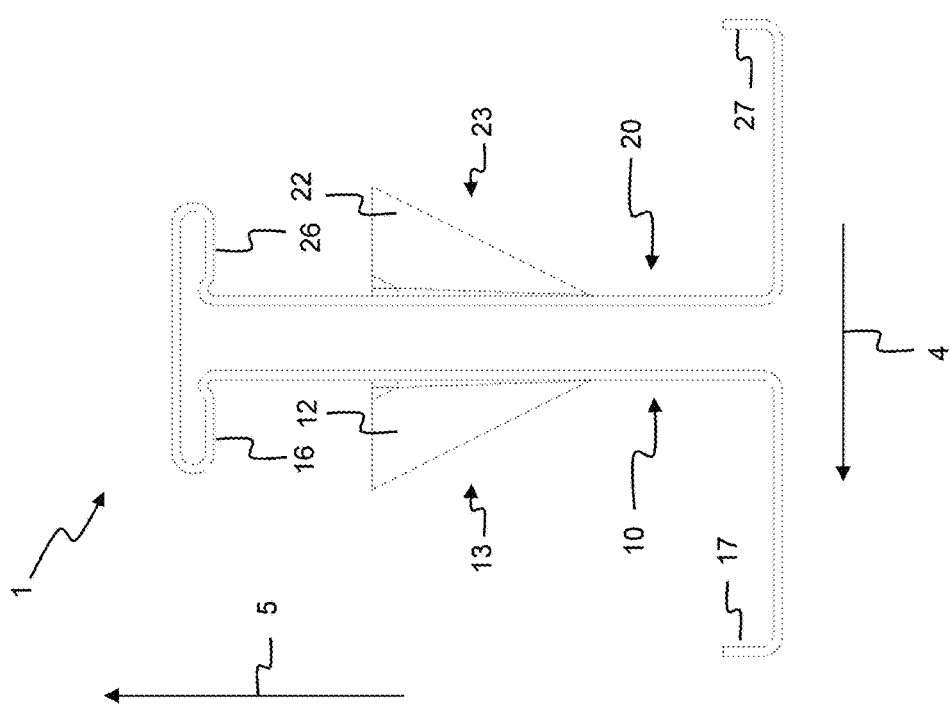

According to still a further embodiment shown in FIGS. 11A and 11B, a structural profile 1 similar to the embodiment of FIGS. 10A and 10B is provided, where a plurality of panel support sections 12, 22 are formed according to alternative manufacturing technique. The panel supports 13, 23 are obtained by partial punching, i.e. applying one cut to the wall 10, 20 and applying pressure below the resulting cut in order to form a lip from the material of the wall 10, 20 and extending from this wall 10, 20, and thereby creating the opening 14, 24.

According to an embodiment in FIG. 12, a structural profile 1 is shown similar to the one described in FIG. 3, where a plurality of spaced panel support sections 12, 22 of the structural profile 1 are formed of material taken from the wall 10, 20, such that this does not leave an opening in this wall 10, 20, by means of a deep drawing operation creating the circumference of the panel support section 12, 22.

Figure 13:
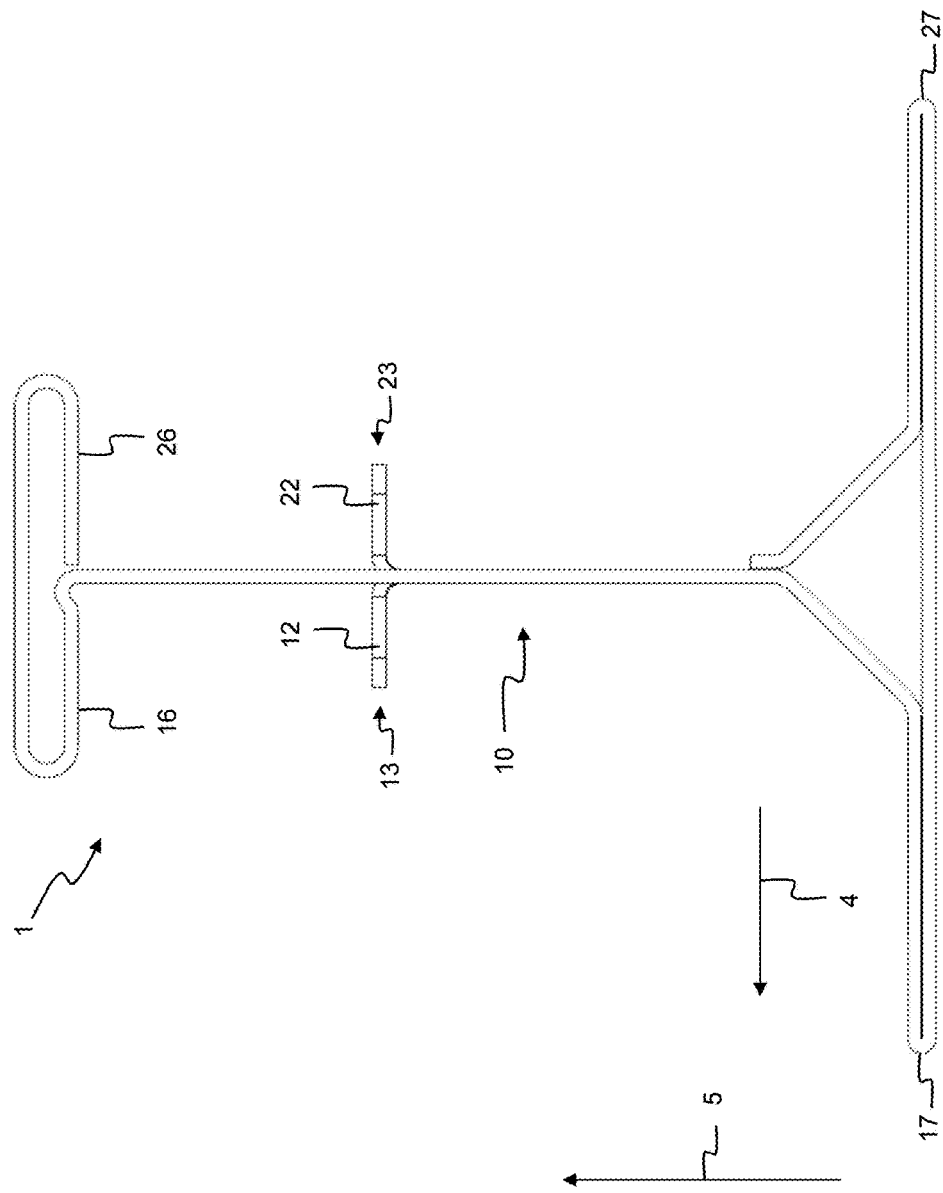
FIG. 13 schematically illustrates a front view of an alternative embodiment of a structural profile comprising a single wall from which two panel supports are formed, two coupled top covers and two coupled base sections.
Figure 14:
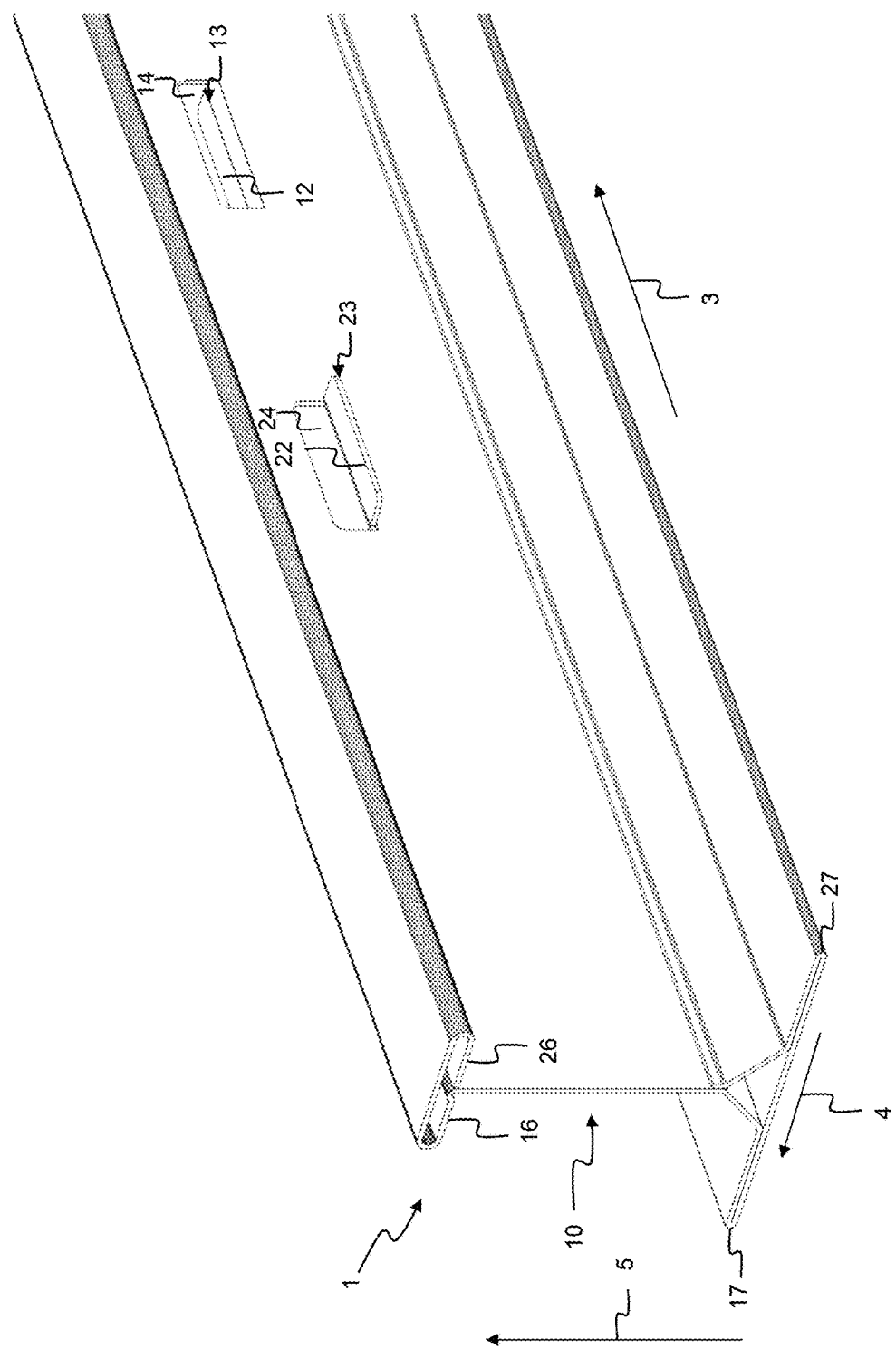
FIG. 14 schematically illustrates a perspective view of an alternative embodiment of a structural profile similar to the one depicted in FIG. 13, where the structural profile comprises panel supports formed of material taken from the wall which are arranged alternatingly along the length direction.

According to an embodiment in FIGS. 13 and 14, a structural profile 1 is shown that comprises a single wall 10, a first top cover 16, a first base section 17, a first panel support 13, a second top cover 26, a second base section 27 and a second panel support 23. The structural profile 1 is formed in a single metal plate, for instance aluminium or preferably steel. A partial punching operation creates the circumference of the panel support section 12 and is followed by a bending operation configured to extend the panel support section 12 from the wall 10 thereby leaving the opening 14 in the wall 10. The opening 14 is smaller than the height of the wall 10. The first and second top covers 16, 26 are coupled to each other. The first and second base sections 17, 27 are also coupled to each other. The first and the second panel supports 13, 23 are positioned at the same height on the first wall 10 and are also opposite to each other along the direction 4. But the first and second panel supports 13, 23 are made of material taken from the first wall 10. They are therefore alternatively arranged along the length direction 3 in the first wall 10. It is clear that in this way the first and second panel supports 13, 23 are not continuous along the length direction 3. As shown in FIG. 14, the first and second top covers 16, 26 are continuous and coupled to each other. The first and second base sections 17, 27 are also continuous and also coupled to each other. As explained above a punching operation was for example used to create the circumference of the panel support section 12, 22 and was followed by a bending operation configured to extend the panel support section 12, 22 from the wall 10 thereby leaving the opening 14, 24 in the wall 10. The height opening 14, 24 is smaller than the height of the wall 10, preferably the height of the opening is smaller than for example 50%, preferably smaller than 30% of the height of the wall 10. The first and the second panel supports 13, 23 are positioned at the same height on the first wall 10 and are also opposite to each other along the direction 4. It is clear that the first and second panel supports 13, 23 are made of material taken from the first wall 10 and are therefore alternatively arranged along the direction of the first wall 10. They can alternate periodically, i.e. the first and the third and the fifth panel supports 13 are extending on the left side of the wall 10, while the second and the fourth panel supports 23 are extending on the right side of the wall 10. It is understood that according to alternative embodiments non-periodically alternating panel supports 13, 23 are possible. It is further clear that the first and second panel supports 13, 23 are not continuous along the length direction 3, while the top covers 16, 26 and base sections 17 are.

In this way, as shown in FIGS. 12 and 13 such an embodiment generally forms a structural profile in which the continuous top cover 16, 26 and base section 17, 27 from the flanges and the single wall 10 forms the web. The continuous base section and top cover, which are shown to be arranged at both sides relatively far from the neutral axis of the structural profile in this way enable a moment of inertia that enables a good resistance to bending in the plane parallel to the wall which forms the web, to withstand for example the loads induced by the weight of the solar panels, snow, wind, etc. On the other hand, the material taken for forming the panel support sections is taken from the wall that forms the web of the structural profile at a position closer to the neutral axis, and thus with a minimal impact on the resistance to bending in the plane parallel to the wall 10 which forms the web.

Figure 15:
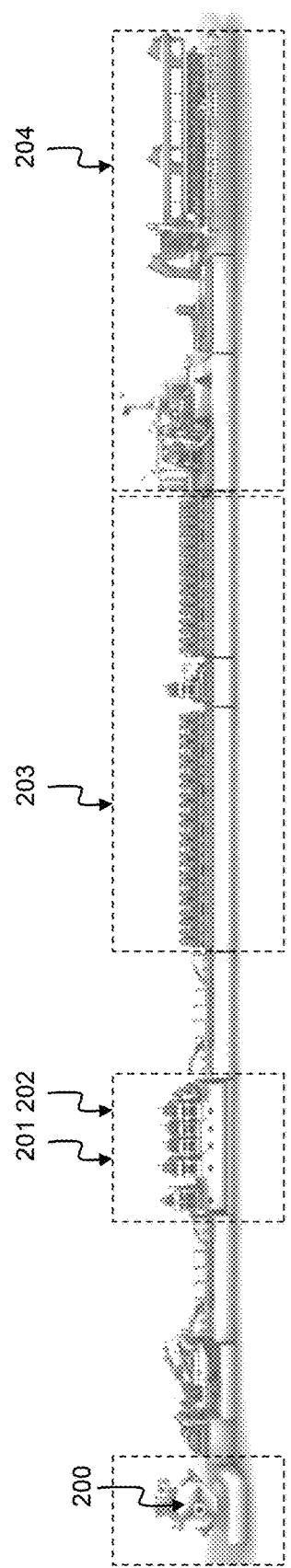
FIG. 15 schematically illustrates an embodiment of a production line adapted to manufacture a structural profile adapted to support a solar panel.

The manufacturing process line is depicted in FIG. 15. A metal plate 200 is provided at the beginning of the line. The metal plate 200 can be for instance made of aluminium, and preferably from steel. It is for example 310.4 mm wide and 1.2 mm thick. The metal plate 200 is arranged in a reel that is first planarized in order to release any internal strain of the material. The production is not interrupted when the reel is finished as a new reel is immediately loaded on the production line. The second step 201 consists in punching the metal plate in order to create holes, protrusions, and ridges. The punching pattern is pre-programmed in the machine and is repeated along the length of the metal plate. Therefore, identical punching patterns are periodically manufactured along the metal plate. During this step 201, the circumference of the openings 14, 24 in the walls of the structural profile 1 is partially punched or punched and the panel supports 13, 23 are partially punched or punched. The fact that the position of the openings 14, 24 and of the panel supports 13, 23 is pre-programmed brings flexibility to the process in order to easily adapt the position of the panel supports 13, 23 in function of solar panels with different thicknesses. Indeed, partially punching or punching an opening 14, 24 or a panel support 13, 23 at a different position only requires a simple reconfiguration of the matrix defining the punching pattern, for example only involving a horizontal movement of that matrix. After punching 201, the panel support 13, 23 is bent at 90 degrees during step 202, with a tolerance of 2 degrees. The metal plate 200 is consequently roll formed at different locations during step 203 thereby creating a so-called flower until the shape of the flower reaches the desired shape of structural profile 1. It is clear that the numerous rolls being in use during the roll forming process do not require any modifications when the production needs to be adapted in function of the thickness of the solar panel. The structural profile 1 is then cut to the desired length and subsequently suitably bundled and/or packaged during step 204.

Figure 16:
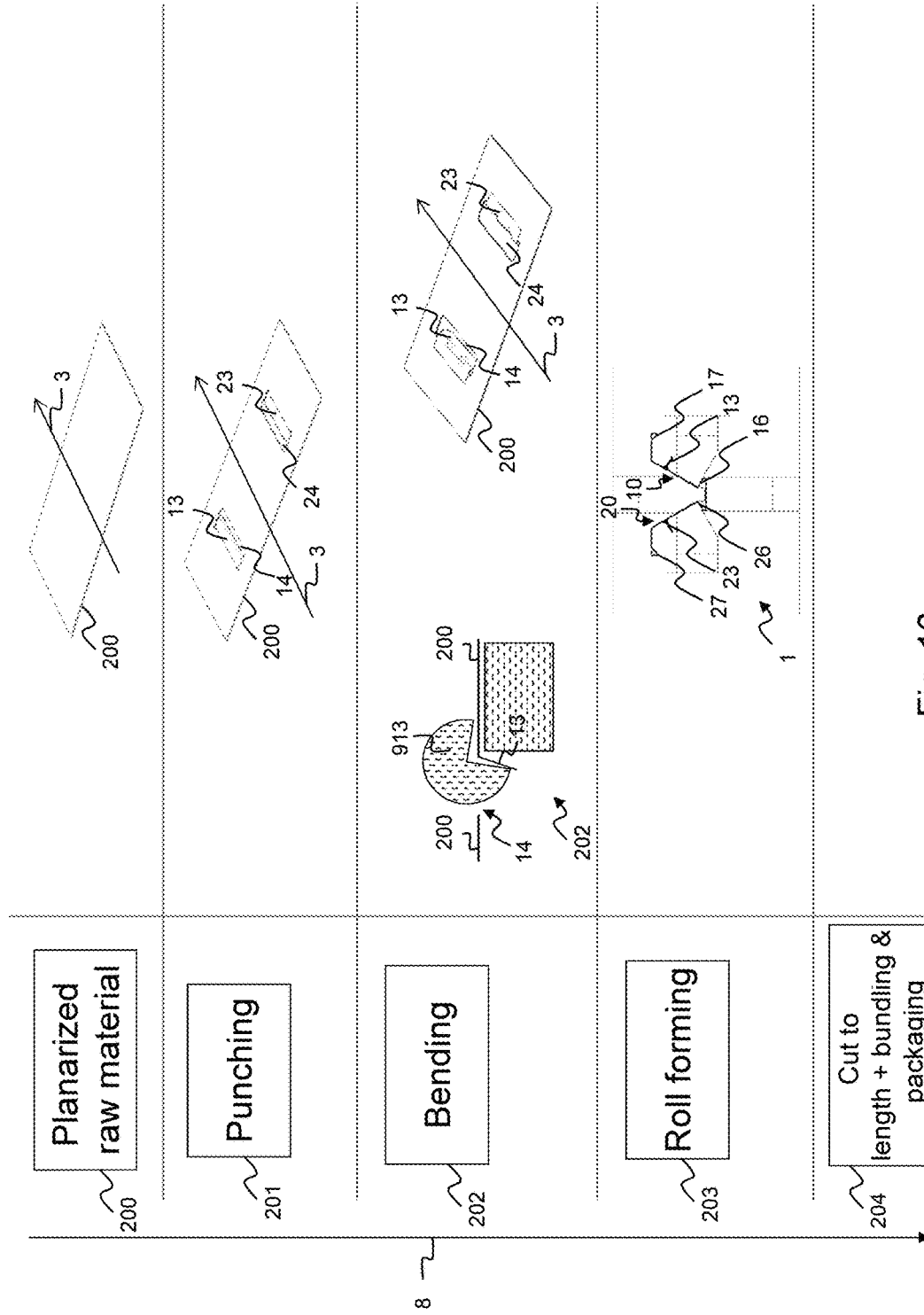
FIG. 16 schematically illustrates an embodiment of the consecutive operations of the manufacturing process adapted to fabricate a structural profile.

According to an embodiment shown in FIG. 16, the axis 8 indicates the chronological order of the steps of the manufacturing process of the structural profile 1 by means of the manufacturing process line depicted in FIG. 15. The arrow 3 across the metal plate 200 indicates the length direction 3 of the structural profile 1. First, the metal plate 200 is planarized in order to release any internal strain of the material. Holes and circumferences of openings 14, 24 are partially punched or punched during step 201 in order to define the contour of the panel supports 13, 23. The panel supports 13, 23 are later bent at 90 degrees during the step 202. The sketch, showing only the left half of the metal plate with respect to its axis of symmetry along the length direction 3, illustrates the bending process as it depicts a cross-section of the bending tool and of the loaded metal plate 200 being bent at the position of the panel support 13, thereby creating an opening 14 where material was taken from the metal plate 200 to form the panel support 13. A roll 913 bends the panel support 13 under a 90 degree-angle, while a roll (not shown) at the opposite side simultaneously bends a panel support 23 under a 90 degree-angle at the opposite side of the metal plate 200. The bending step 202 is followed by a sequence of roll forming steps 203 in order to roll form the metal plate 200 until its shape reaches the desired shape of the structural profile 1. During the roll forming steps 203, a first wall 10, a second wall 20, a first and a second top covers 16, 26, a first and a second base sections 17, 27 are formed. After roll-forming, the obtained structural profile is cut to the desired length during step 204.

According to an embodiment shown in FIG. 17, steps A, B and C relate to partial punching or punching and bending of the metal plate 200 in order to create the panel support 13, 23. The steps D to L relate to roll forming of the metal plate 200 until its shape reaches the desired shape of the structural profile 1. The metal plate 200 is first planarized in order to release any internal strain, thereby obtaining the metal plate in step A. The metal plate is afterwards partially punched or punched in step B in order to define the circumference of the openings 14, 24 and the contours of the panel supports 13, 23. In step C, the punched panel supports 13, 23 are bent at 90 degrees. In steps D, E, F, the base sections 17, 27 are roll formed. In step G, the spacers 11, 21 are roll formed. In step H, the panel side sections 15, 25 as well as the top covers 16, 26 are roll formed. In step I, the top covers 16, 26 are further roll formed. In steps J, K, L, the first wall 10 and the second wall 20 are roll formed in order to achieve the shape of the desired structural profile 1.

According to an embodiment shown in FIGS. 18A and 18B, two examples of the arrangement and construction of rolls during the roll forming process of a structural profile 1 are depicted in cross-sections. In FIG. 18A, the combination of rolls 811 and 911, and the combination of rolls 821 and 921 respectively form the spacers 11 and 21. The position of the panel supports 13, 23 is adapted to that rolls can fit between the base sections 17, 27 and the panel supports 13, 23. Still in FIG. 18A, the combination of rolls 815 and 915, and the combination of rolls 825 and 925 respectively form the first and the second walls 10 and 20 and more particularly the panel side sections 15 and 25. According to an alternative embodiment, a single roll comprising the rolls 811 and 815 and a suitable opening at the position of the panel support 13 can be used to simultaneously form the spacer 11 and the base section 17. Similarly, a single roll comprising the rolls 821 and 825 and a suitable opening at the position of the second panel support 23 can be used to simultaneously form the spacer 21 and the base section 27. In FIG. 18B, the combination of rolls 916, 926, 910 and 920 forms the top covers 16 and 26 by roll forming the first and the second walls 10 and 20. The position of the panel supports 13, 23 is adapted to that rolls can fit between the base sections 17, 27 and the panel supports 13, 23.

Figure 19A:
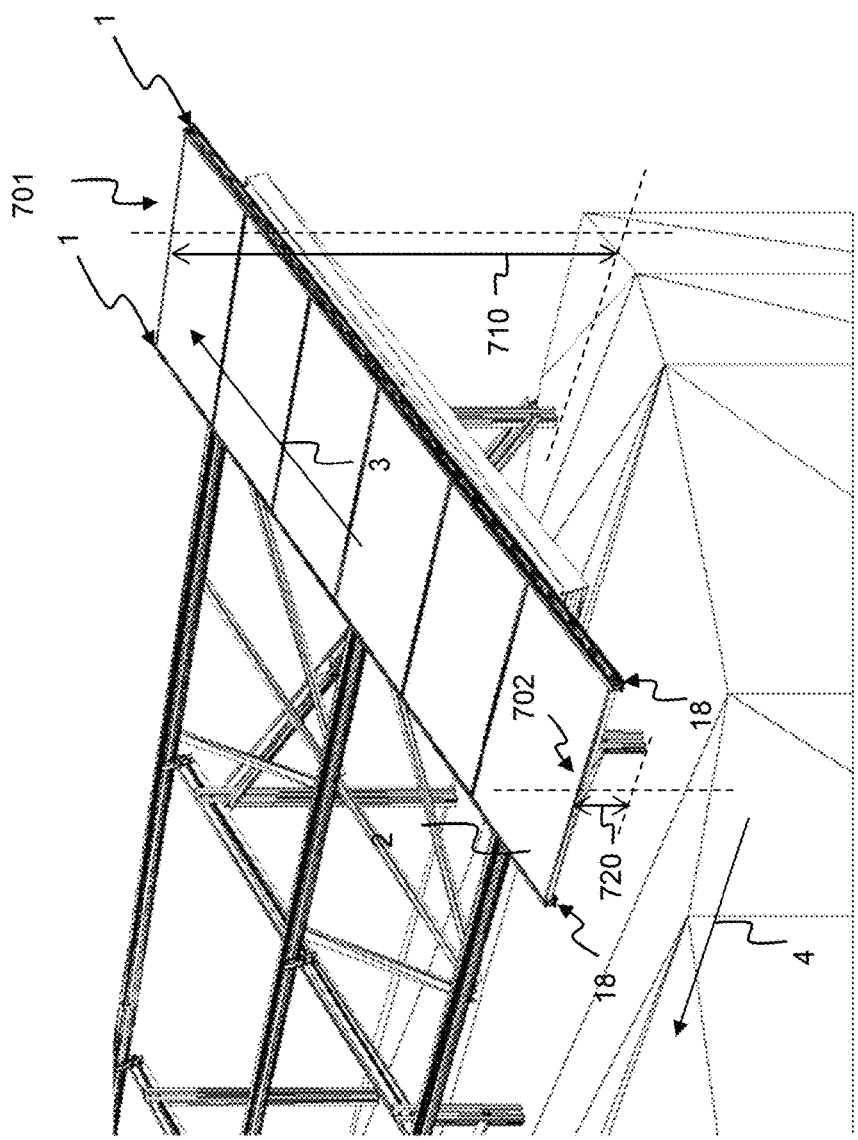

According to an embodiment shown in FIG. 19A to FIG. 19D, a stop element 18, 28 is positioned on the structural profile 1. Components in FIG. 19A having identical reference numbers to components in FIG. 2 perform the same function. As visible in the top view depicted in FIG. 19B, a stop element 18, 28 comprises a groove 180, 280, a handle 181, 281 and a hook 182, 282. As clearly shown in FIG. 19C which is a detailed view of fragment B in FIG. 1C, the panel supports 13, 23 of this embodiment are discontinuous along the length direction 3. This means that the panel supports 13, 23 comprises a plurality of panel support sections 12, 22 formed of material taken respectively from the first wall 10 and the second wall 20 spaced along the length direction 3. As visible in FIG. 19C, the structural profile is inclined under an angle 301 labelled a. In other words, as depicted in FIG. 19C, the structural profile 1 is inclined such that there exists an angle 301 labelled a between the length direction 3 and the horizontal direction 308. The horizontal direction 308 may for example be parallel to the ground on which the structural profile 1 rests. A higher end 701 of the structural profile 1 is identified as the section of the structural profile 1 for which the height 710 from the structural profile 1 to the horizontal direction 308 is the largest. A lower end 702 of the structural profile 1 is identified as the section of the structural profile 1 for which the height 720 from the structural profile 1 to the horizontal direction 308 is the smallest. An operator can hold the handle 181, 281 and secure the stop element 18, 28 on the structural profile 1 holding the stop element 18, 28 by the handle 181, 281, and more particularly can secure the stop element 18, 28 at the lower end 702 of the structural profile 1. A timeline 304 visible in FIG. 19C establishes the chronological order of the steps of the mounting of the stop element 28 on the lower end 702 of the structural profile 1. As visible in FIG. 19C, a stop element 28 can be mounted on the opening 24 of the second wall 20 at the lower end 702 of the structural profile 1 for which the height from the structural profile 1 to the horizontal direction 308 is the smallest. According to another embodiment, a stop element 18 can be mounted on the opening 14 of the first wall 10 at the lower end 702 of the structural profile 1 for which the height from the structural profile 1 to the horizontal direction 308 is the smallest. According to a further alternative embodiment, a stop element 18 and a stop element 28 can be respectively mounted in the opening 14 and the opening 24 of respectively the first wall 10 and the second wall 20 at the lower end 702 of the structural profile 1 for which the height from the structural profile 1 to the horizontal direction 308 is the smallest. In a first step 305, the solar panel 6 is slidably mounted on the structural profile 1 along the length direction 3 of the structural profile 1 in between the top cover 26 and the corresponding panel support 23 of the second wall 20 of the structural profile 1. The solar panel 6 therefore rests on the panel support 23 in an intermediate mounting position different from a final mounted position 302. The solar panel 6 is indeed slid along the length direction 3 of the structural profile 1. Alternatively, in step 305, a solar panel 2 could be slidably mounted on the structural profile 1 along the length direction 3 of the structural profile 1 between the top cover 16 and the corresponding panel support 13 of the first wall 10 of the structural profile 1. According to a further alternative embodiment, a solar panel 6 and a solar panel 2 can be slidably mounted on the structural profile 1 along the length direction 3 of the structural profile 1, respectively between the top cover 26 and the corresponding panel support 23 and between the top cover 16 and the corresponding panel support 13. In the second step 306, the stop element 28 is moved around in a plane parallel to the plane comprising length direction 3 and the direction 4 as defined in FIG. 19A. In this plane, the stop element 28 is inserted in the opening 24 such that the section 31 of the opening 24 in the second wall 20 parallel to the direction 5 and the furthest from higher end 701 of the structural profile 1 is comprised in the plane defined by the middle 310 of the groove 280 of the stop element 28 and parallel to the direction 5. The stop element 28 is then slid along the second wall 20 in the plane parallel to the plane comprising length direction 3 and the direction 4 as defined in FIG. 19A. The stop element 28 is slid from the higher end 701 of the structural profile 1 to the lower end 702 of the structural profile 1. FIG. 19D depicts a cross-section of step 306 illustrated in FIG. 19C along the axis AA'. It is clear from FIG. 19D that a stop element 18 is mounted on the first wall 10 and a stop element 28 is mounted on the second wall 20. Similarly, the stop element 18 is inserted in the opening 14 such that the section 30 of the opening 14 in the first wall 10 parallel to the direction 5 and the furthest from the higher end 701 of the structural profile 1 is comprised in the plane defined by the middle 309 of the groove 180 of the stop element 18 and parallel to the direction 5. The stop element 18 is then slid along the first wall 10 in the plane parallel to the plane comprising length direction 3 and the base section 17. The stop element 18 is slid from the higher end 701 of the structural profile 1 to the lower end 702 of the structural profile 1. The stop elements 18, 28 are slid along respectively the first wall 10 and the second wall 20 until the first wall 10 and the second wall 20 are inserted as far as possible in the respective grooves 180, 280. In the final mounting positions of the stop elements 18, 28 depicted in the cross-section of FIG. 19D, the hooks 182, 282 are located respectively at the inner sides of the first wall 10 and the second wall 20 and are equally distant from the symmetry plane 303 of the structural profile 1, while the respective handles 181, 281 are located at the respective outer sides of the first wall 10 and of the second wall 20. In a third step 307 depicted in FIG. 19C, the solar panel 6 is slidably translated on the panel support 23 along the length direction 3 until it reaches its final mounted position 302 at which the solar panel 6 rests against the stop element 28 under the effect of gravity. As depicted in FIG. 19D, similarly, a solar panel 2 is slidably translated on the panel support 13 along the length direction 3 until it reaches its final mounted position 302 at which the solar panel 2 rests against the stop element 18 under the effect of gravity. According to an alternative embodiment, only one of the stop elements 18, 28 is mounted on the structural profile 1, either on the first wall 10 or on the second wall 20. For example, the stop element 18 depicted in FIG. 19B can be used to be mounted on the first wall 10. Additionally, thanks to the symmetry of the structural profile 1, the stop element 18 may be used as a stop element 28 for the second wall 20 by rotating the stop element 18 so as to obtain a mirrored stop element 18 with respect to the symmetry plane 303 of the structural profile 1 as defined in FIG. 19D.

According to an embodiment visible in FIG. 20A, the structural profile 1 is identical to the one depicted in FIG. 3. Components in FIG. 20A having identical reference numbers to components in FIG. 3 perform the same function. A solar panel 2 is slidably mounted along the length direction in between the top cover 16 and the corresponding panel support 13 of the structural profile 1 until the solar panel 2 reaches its final mounted position. Additionally, a solar panel 6 is slidably mounted along the length direction in between the top cover 26 and the corresponding panel support 23 of the structural profile 1 until the solar panel 6 reaches its final mounted position. The structural profile 1 further comprises two grounding elements 19, 29, respectively positioned between the solar panels 2, 6 and the panel supports 13, 23. The grounding elements 19, 29 respectively comprise a horizontal platform 190, 290, a grounding lip 191, 291, anti-loosening lips 192, 292, and a plurality of earthing lips 193, 293. The horizontal platforms 190, 290 are slid between the solar panels 2, 6 and the panel supports 13, 23 in the opposite direction as the direction 4 depicted in FIG. 10 for the grounding element 19 and in the direction 4 for the grounding element 29. The grounding elements 19, 29 are slid in the formerly mentioned directions until the grounding lips 191, 291 are in contact with the respective bent over lips 400, 401 of the panel supports 13, 23, thereby covering said bent over lips 400, 401. The grounding elements 19, 29 are also slid under the respective solar panels 2, 6 in the formerly mentioned directions until the anti-loosening lips 192, 292 are freely released after the grounding elements 19,29 are slid further than the respective edges 32, 33 of the corresponding solar panels 2, 6. The anti-loosening lips 192, 292 act as a retaining lip for the grounding elements 19, 29, thereby preventing them from falling out of the structural profiles 1. The grounding elements 19, 29 also comprise earthing lips 193, 293 in contact with the solar panels 2, 6 and earthing the solar panels 2, 6. The fact that the structural profile 1 comprises two vertical walls 10, 20 separated or positioned from each other by a suitable distance allows the simultaneous insertion of a grounding element 19, 29 on each side of the structural profile 1. In other words, due to the fact that the structural profile 1 comprises two walls substantially distant from each other ensures that the positioning of a grounding element on one panel support of the first wall or the second wall of the structural profile 1 does not prevent the positioning of a second grounding element on a panel support defined at the same location as the first panel support along the length direction of the structural profile 1 and defined from the respective other vertical wall of the structural profile 1. This is only possible if the structural profile 1 comprises two vertical walls 10, 20.

Figure 20C:
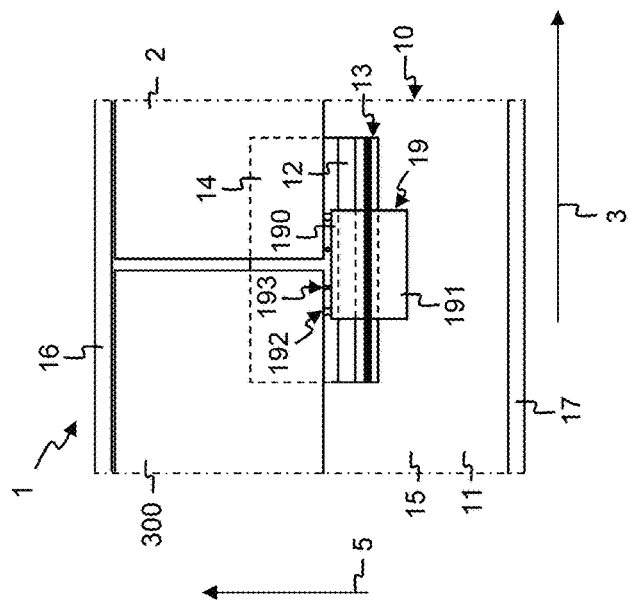
Figure 20B:
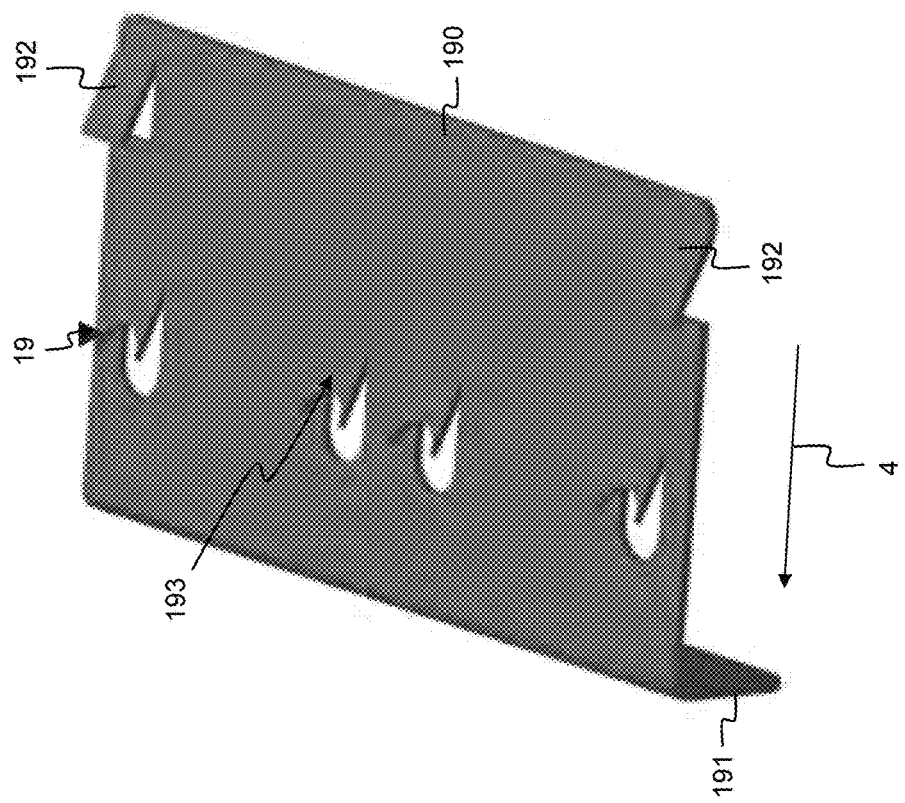

According to an embodiment visible in FIGS. 20B and 20C, a grounding element 19, 29 comprises a horizontal platform 190, 290, a grounding lip 191, 291, two anti-loosening lips 192, 292, and a plurality of earthing lips 193, 293. The grounding lip 191, 291 is extending perpendicularly from the horizontal platform 190, 290 of the grounding element 19, 29. As visible in FIG. 20C, the grounding element 19 is positioned parallel to the width direction 4 of the structural profile 1. The anti-loosening lips 192, 292 are formed of material of the horizontal platform 190, 290 of the grounding element 19, 29, and are for example formed by partially punching the horizontal platform 190, 290, thereby creating the circumference of the anti-loosening lips 192, 292, and by subsequently bending the partially punched area, thereby forming the anti-loosening lips 192, 292. The anti-loosening lips 192, 292 are formed at the opposite edge of the horizontal platform 190, 290 with respect to the grounding lip 191, 291. The plurality of earthing lips 193, 293 are formed of material of the horizontal platform 190, 290 of the grounding element 19, 29, and are for example formed by punching the horizontal platform 190, 290 and subsequently by partially punching the horizontal platform 190, 290, thereby creating the circumference of the earthing lips 193, 293, and by subsequently bending the partially punched area, thereby forming the earthing lips 193, 293. FIG. 20C depicts a lateral view along the length direction 3 of a structural profile 1 on which two adjacent solar panels 2, 300 are slidably mounted and on which a grounding element 19, 29 is positioned. The structural profile 1 comprises a wall 10, a panel side section 15, a spacer 11, a top cover 16, and a first base section 17. The structural profile 1 also comprises a panel support section 12 and a first panel support 13 corresponding to the opening 14. Two adjacent solar panels 2, 300 are slidably mounted between the panel support 13 and its corresponding top cover 16 along this wall 10 in the length direction 3. The solar panels 2, 300 are mounted in a final mounted position. A grounding element 19 is inserted under the solar panels 2, 300 such that its horizontal platform 190 is parallel to the first panel support 13 and such that its horizontal platform 190 covers the first panel support 13 and thereby being partially covered by each of the solar panels 2, 300. The grounding element 19 is slid under the solar panels 2, 300 in a direction perpendicular to the lateral view depicted in FIG. 20C until a final secured position for which the grounding lip 191 of the grounding element 19 comes in contact with the first panel support 13. The grounding element 13 also comprises a plurality of earthing lips 193 that come in contact with the solar panels 2, 300 when the grounding element 19 is secured on the structural profile 1 in a final secured position.

Figure 21:
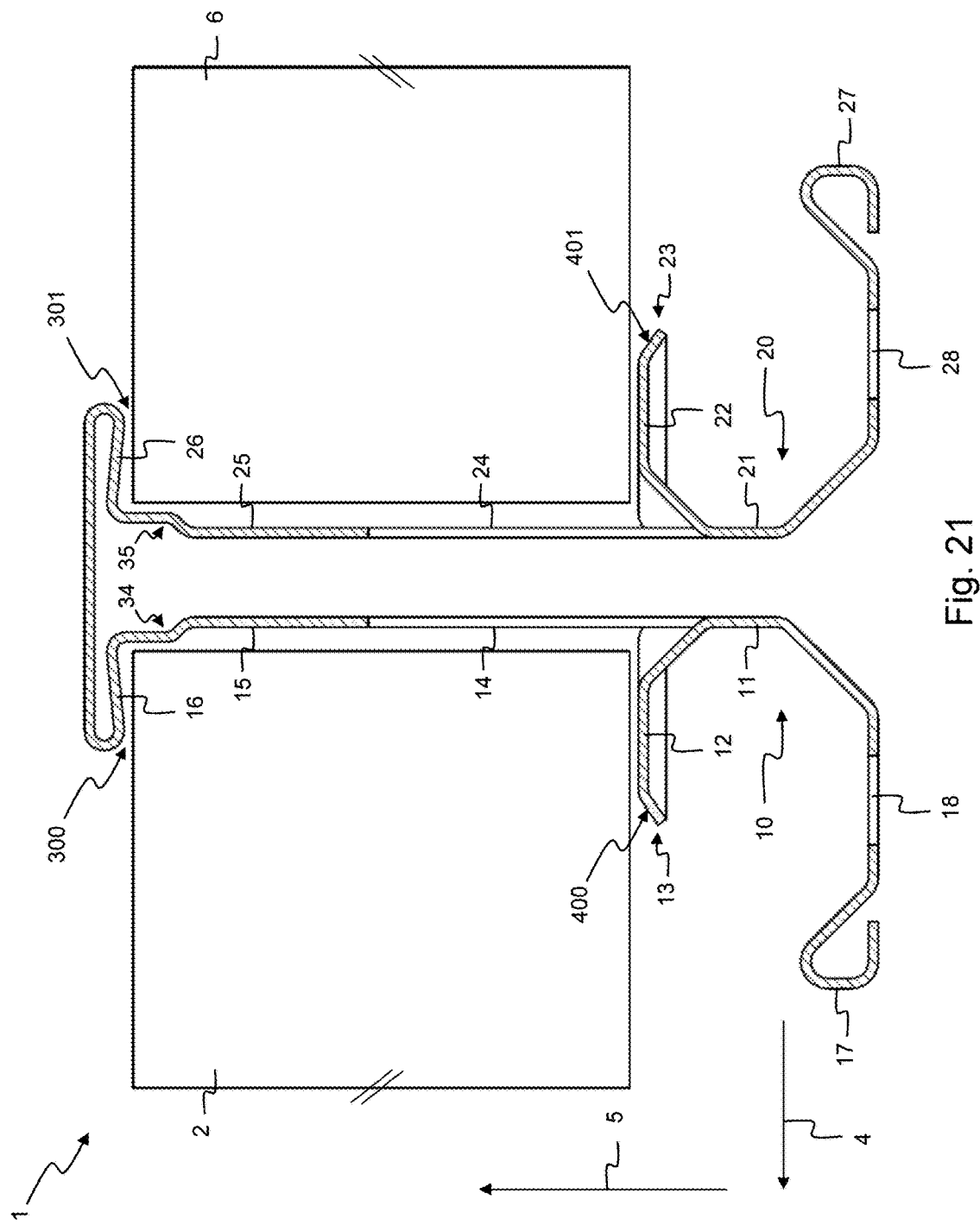
FIG. 21 is a schematic cross-section along a plane perpendicular to the length direction of an alternative embodiment of a structural profile along a plane perpendicular to the length direction, where the structural profile comprises two walls, two coupled top covers, two base sections and two panel supports on which two solar panels rest.

According to a further embodiment shown in FIG. 21, similar to that of FIG. 2, the structural profile 1 comprises a first wall 10 from which a continuous first top cover 16 and its corresponding continuous first base section 17 and its corresponding discontinuous panel support 13 extends. The structural profile 1 further comprises a second wall 20 from which at least a continuous second top cover 26 and its corresponding continuous second base section 27 and its corresponding discontinuous second panel support 23 extend. As shown they extend from the second wall 20 at the opposite side as the side of the wall 10 from which the first top cover 16 extends. As shown, similarly as in the previous embodiments the structural profile 1 is formed in a single metal plate, for instance aluminium or preferably steel, in which the spaced panel support sections 12 of the panel support are formed, for example by means of a punching operation that created the circumference of the panel support section 12 and was followed by a bending operation to extend the panel support section 12 from the wall 10 thereby leaving the opening 14 in the wall 10. As shown, the height opening 14 is smaller than the height of the wall 10, preferably the height of the opening is smaller than for example 50%, preferably smaller than 30% of the height of the wall 10. As further shown, the second wall 20 is substantially parallel to the first wall 10 and positioned on the opposite side of the first wall 10 than that side from which its first top cover 16 extends. The first top cover 16 is coupled to the second top cover 26. In other words, as shown, as the first top cover 16 and second top cover 26 are formed from a single sheet of metal they are directly connected. It is clear that alternative embodiments are possible in which the first and the second top covers 16, 26 can be directly connected to each other, or according to still further alternative embodiments they can be coupled to each other through an intermediate element, such as for example a suitable cap continuously covering the first and second top covers 16, 26. The wall 10 between the top cover 16 and the opening 14 forms a panel side section 15 which guides a solar panel during sliding. The wall 10 between the base section 17 and the panel support 13 forms a spacer 11, where electrical cables connected to the solar panels are grouped and protected from harsh weather conditions along the length direction 3. Similarly, the wall 20 presents a panel side section 25, which guides a solar panel during sliding, and a spacer 21, which guides and protects electrical cables. According to an alternative embodiment, the first and the second base sections 17, 27 can be coupled to each other, which means that they can be directly connected to each other, or connected through an intermediate element. For example, by means of the openings 18 and 28, which are respectively provided in the base sections 17 and 27, the structural profile 1 can be fixed to a structure or to the ground, depicted as element 7 of FIG. 4 and FIG. 5, using screws or clips fitting in the openings 18 and 28 of the first and second base sections 17, 27, thereby coupling the base sections 17, 27. As further shown, it is clear that according to this embodiment the first and the second panel supports 13, 23 are positioned at the same height on respectively the first and the second wall 10, 20, and are also opposite to each other along the direction 4, thereby making them suitable for use in an assembly for mounting solar panels with substantially the same thickness. Although as shown in FIG. 21 also the panel support sections 12, 22 of the panel supports 13, 23 extend substantially transverse respectively to the vertical plane of the first wall 10 and of the second wall 20, it is clear that according to alternative embodiments, different angles are possible as long as in general the panel supports 13, 23 are positioned below their corresponding top covers 16, 26 such that a solar panel 2 can be slid between the panel support 13 and its corresponding top cover 16 along the first wall 10 in the length direction and such that a solar panel 6 can be slid between the panel support 23 and its corresponding top cover 26 along the second wall 20 in the length direction. When the solar panel 2 is slid between the panel support 13 and the corresponding top cover 16 along the first wall 10 and along the length direction, the section of the first wall 10 between the top cover 16 and the opening 14 forms a panel side section 15 which guides the solar panel 2 during sliding. When the solar panel 6 is slid between the panel support 23 and the corresponding top cover 26 along the second wall 20 and along the length direction, the section of the second wall 20 between the top cover 26 and the opening 24 forms a panel side section 25 which guides the solar panel 6 during sliding. The first wall 10 between the base section 17 and the panel support 13 forms a spacer 11, where for example mounting means for mounting the structural profile to an assembly or electrical cables connected to the solar panel 2 can be provided and protected from harsh weather conditions. The second wall 20 between the base section 27 and the panel support 23 forms a spacer 21, where for example mounting means for mounting the structural profile to an assembly or electrical cables connected to the solar panel 6 can be provided and protected from harsh weather conditions. Therefore, an edge 300 of the solar panel 2 is in secured below the first top cover 16, and an edge 301 of the solar panel 6 is secured below the second top cover 26. As shown in FIG. 21, the top cover 16 further comprises a lip 34 and the top cover 26 further comprises a lip 35. The two lips 34, 35 are continuous along the length direction 3 of the structural profile 1. The continuous lips 34, 35 guide respectively the solar panels 2, 6 in between the top covers 16, 26 and the first and second panel supports 13, 23, when the solar panels 2, 6 are slidably mounted on the structural profile 1. The two lips 34, 35 further ensure the solar panels 2, 6 are maintained at a constant distance from the respective panel side sections 15, 25 along the length direction of the structural profile 1. The solar panel 2 slides against the lip 34 when slidably mounted on the structural profile and rests against the lip 34 in a final mounted position while the solar panel 6 slides against the lip 35 when slidably mounted on the structural profile and rests against the lip 35 in a final mounted position. The contact surface between the lips and the solar panel during the sliding operation is reduced which further facilitates movement of the solar panels during the sliding operation.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An assembly comprising at least two structural profiles arranged parallel to each other with respect to their length direction and at least one solar panel, wherein: each of said structural profiles comprises:
    a first wall from which a first top cover, a corresponding first base section at a position below the first top cover, and a corresponding first panel support at a position below the first top cover and above the first base section extend;
    a second wall from which a second top cover, a corresponding second base section at a position below the second top cover, and a corresponding second panel support at a position below the second top cover and above the second base section extend;
    said second wall being substantially parallel to said first wall and positioned on an opposite side of said first top cover; and said second top cover extending from said second wall on the opposite side of said first wall and said first top cover being coupled to said second top cover;
    said first and second base sections, and said first and second top covers extending continuous along said length direction; and
    each of said first and second panel supports extending from one of the first and second walls at a position below said first and second top covers, such that said solar panel can only be slidably mounted between one of said first and second panel supports and one of said first and second top cover along one of said first and second walls in the length direction; and
    each of said first and second panel supports comprising a plurality of spaced panel support sections formed of material taken from said first and second walls, respectively, and
    wherein each of said plurality of structural profiles is positioned such that, in between the top covers and the corresponding panel supports of said structural profiles, along the length direction, said at least one solar panel can only be slidably mounted at opposing edges of the solar panel,
    wherein said length direction of each of said parallel structural profiles is inclined at an angle with respect to a horizontal plane, such that each of said parallel structural profiles extends along the length direction from a lowest end at a first height above said horizontal plane to a highest end at a second height above said horizontal plane, said second height being larger than said first height, and
    wherein each of said parallel structural profiles are mounted such that in between each of the adjacent structural profiles two or more identical solar panels can be sequentially slidably mounted from the lowest end along the length direction to the highest end.

2. The assembly according to claim 1, wherein said at least two parallel structural profiles are identical, and are arranged adjacent to each other along a direction transverse to said length direction, such that said at least one solar panel can be slidably mounted along the length direction in between each of said adjacent, identical structural profiles.

3. The assembly according to claim 1, wherein said assembly further comprises a plurality of parallel, longitudinal transverse elements, extending along a width direction transverse to said length direction, on which said parallel structural profiles are mounted, the distance between said longitudinal transverse elements being larger than a width of said at least one solar panel along the length direction.

4. The assembly according to claim 3, wherein each of said parallel structural profiles are mounted such that in between each of the adjacent structural profiles two or more identical solar panels can be sequentially slidably mounted along the length direction in landscape orientation with respect to the width direction.

5. The assembly according to claim 1, wherein said first base section is coupled to said second base section.

6. The assembly according to claim 1, wherein said first wall and said second wall extend upright between the base sections and top covers over at least 70%, preferably at least 80% of a height of the walls.

7. A method of mounting said assembly according to claim 1, wherein said method comprises the steps of:
    arranging said plurality of structural profiles parallel to each other; and
    positioning each of said plurality of structural profiles such that, in between the respective top covers and their corresponding panel supports of adjacent structural profiles, along the length direction, at least one solar panel can be slidably mounted at opposing edges of the solar panel, and
    wherein the method further comprises the step of sequentially slidably mounting two or more identical solar panels in between each of the adjacent structural profiles from the lowest end along the length direction to the highest end.

8. A method of manufacturing said structural profiles of said assembly according to claim 1, said method of manufacturing comprising the steps of:
    in a first step, providing a metal plate;
    in a second step subsequent to said first step, partially punching said metal plate at a region which will be used for forming said wall from which the corresponding top cover extends, thereby creating the circumference of said opening;

in a third step subsequent to said second step, bending said circumference of said opening, thereby creating each of said plurality of spaced panel support sections; and in a fourth step subsequent to said third step, performing a roll forming operation on said metal plate for forming:
said at least one wall;
said at least one top cover;
at least one base section; and
said panel side section,
such that, when modifying the distance from at least one of said panel supports of said plurality of spaced panel support sections to said top cover, these steps are performed:
a modification of the position of said partial punching of said region which will be used for forming said wall in said second step of said method of manufacturing such that the position of said circumference of said opening is modified; and
consequently a modification of the position of said bending of said circumference of said opening in said third step of said method of manufacturing.

9. The assembly according to claim 1, wherein said assembly further comprises, for each of the corresponding walls of each of the structural profiles along which solar panels are slidably mounted, a stop element inserted in an opening of said corresponding wall between said solar panels and said lower end of said structural profile, said stop element comprising a groove extending along the length direction towards the lower end in which said corresponding wall can be introduced until reaching the end of said groove in a final secured position, in which, said stop element stops said slidably mounted solar panels in a final mounted position.

10. A method of mounting said assembly according to claim 1, wherein said method comprises the steps of:
arranging said plurality of structural profiles parallel to each other; and
positioning each of said plurality of structural profiles such that, in between the respective top covers and their corresponding panel supports of adjacent structural profiles, along the length direction, at least one solar panel can be slidably mounted at opposing edges of the solar panel, and
wherein the method further comprises the step of sequentially slidably mounting two or more identical solar panels in between each of the adjacent structural profiles from the lowest end along the length direction to the highest end
wherein said length direction of each of said parallel structural profiles is inclined at an angle with respect to a horizontal plane, such that each of said parallel structural profiles extends along the length direction from a lowest end at a first height above said horizontal plane to a highest end at a second height above said horizontal plane, said second height being larger than said first height,
wherein each of said parallel structural profiles are mounted such that in between each of the adjacent structural profiles two or more identical solar panels can be sequentially slidably mounted from the lowest end along the length direction to the highest end, wherein said assembly further comprises, for each of the corresponding walls of each of the structural profiles along which solar panels are slidably mounted, a stop element inserted in an opening of said corresponding wall between said solar panels and said lower end of said structural profile, said stop element comprising a groove extending along the length direction towards the lower end in which said corresponding wall can be introduced until reaching the end of said groove in a final secured position, in which, said stop element stops said slidably mounted solar panels in a final mounted position, wherein said method further comprises the steps of, for each of the corresponding walls of each of the structural profiles along which solar panels have been slidably mounted,
inserting said stop element in an opening of said corresponding wall between said solar panels and said lower end of said structural profile;
positioning said stop element such that said groove extends along the length direction towards the lower end;
introducing said corresponding wall in said groove until reaching the end of said groove in a final secured position;
said stop element stopping said slidably mounted solar panels in a final mounted position.

11. The method of mounting said assembly according to claim 10, wherein said method further comprises the step of inserting at least one grounding element comprising a planar platform in between at least one of the slidably mounted solar panels when in their final mounted position and at least one of the corresponding panel supports on which the respective end of the respective solar panel rests.

12. An assembly comprising at least two structural profiles arranged parallel to each other with respect to their length direction and at least one solar panel, wherein: each of said structural profiles comprises:
a first wall from which a first top cover, a corresponding first base section at a position below the first top cover, and a corresponding first panel support at a position below the first top cover and above the first base section extend;
a second wall from which a second top cover, a corresponding second base section at a position below the second top cover, and a corresponding second panel support at a position below the second top cover and above the second base section extend;
said second wall being substantially parallel to said first wall and positioned on an opposite side of said first top cover; and said second top cover extending from said second wall on the opposite side of said first wall and said first top cover being coupled to said second top cover;
said first and second base sections, and said first and second top covers extending continuous along said length direction; and
each of said first and second panel supports extending from one of the first and second walls at a position below said first and second top covers, such that said solar panel can be slid between one of said first and second panel supports and one of said first and second top cover along one of said first and second walls in the length direction; and each of said first and second panel supports comprising a plurality of spaced panel support sections formed of material taken from said first and second walls, respectively, and wherein each of said plurality of structural profiles is positioned such that, in between the top covers and the corresponding panel supports of said-structural profiles, along the length direction, said at least one solar panel can be slidably mounted at opposing edges of the solar panel, wherein said length direction of each of said parallel structural profiles is inclined at an angle with respect to a horizontal plane, such that each of said parallel structural profiles extends along the length direction from a lowest end at a first height above said horizontal plane to a highest end at a second height above said horizontal plane, said second height being larger than said first height, wherein each said parallel structural profiles are mounted such that in between each of the adjacent structural profiles two or more identical solar panels can be sequentially slidably mounted from the lowest end along the length direction to the highest end, and wherein said assembly further comprises, for each of the corresponding walls of each of the structural profiles along which solar panels are slidably mounted, a stop element inserted in an opening of said corresponding wall between said solar panels and said lower end of said structural profile, said stop element comprising a groove extending along the length direction towards the lower end in which said corresponding wall can be introduced until reaching the end of said groove in a final secured position, in which, said stop element stops said slidably mounted solar panels in a final mounted position.

13. A method of mounting an assembly, the assembly comprising at least two structural profiles arranged parallel to each other with respect to their length direction and at least one solar panel, wherein: each of said structural profiles comprises:
 a first wall from which a first top cover, a corresponding first base section at a position below the first top cover, and a corresponding first panel support at a position below the first top cover and above the first base section extend;
 a second wall from which a second top cover, a corresponding second base section at a position below the second top cover, and a corresponding second panel support at a position below the second top cover and above the second base section extend;
 said second wall being substantially parallel to said first wall and positioned on an opposite side of said first top cover; and said second top cover extending from said second wall on the opposite side of said first wall and said first top cover being coupled to said second top cover;
 said first and second base sections, and said first and second top covers extending continuous along said length direction; and
 each of said first and second panel supports extending from one of the first and second walls at a position below said first and second top covers, such that said solar panel can only be slidably mounted between one of said first and second panel supports and one of said first and second top cover along one of said first and second walls in the length direction; and each of said first and second panel supports comprising a plurality of spaced panel support sections formed of material taken from said first and second walls, respectively, and wherein each of said plurality of structural profiles is positioned such that, in between the top covers and the corresponding panel supports of said structural profiles, along the length direction, said at least one solar panel can only be slidably mounted at opposing edges of the solar panel, wherein said method comprises the steps of:

arranging said plurality of structural profiles parallel to each other; and positioning each of said plurality of structural profiles such that, in between the respective top covers and their corresponding panel supports of adjacent structural profiles, along the length direction, at least one solar panel can be slidably mounted at opposing edges of the solar panel, and wherein the method further comprises the step of sequentially slidably mounting two or more identical solar panels in between each of the adjacent structural profiles from the lowest end along the length direction to the highest end, wherein said length direction of each of said parallel structural profiles is inclined at an angle with respect to a horizontal plane, such that each of said parallel structural profiles extends along the length direction from a lowest end at a first height above said horizontal plane to a highest end at a second height above said horizontal plane, said second height being larger than said first height, wherein each of said parallel structural profiles are mounted such that in between each of the adjacent structural profiles two or more identical solar panels can be sequentially slidably mounted from the lowest end along the length direction to the highest end, wherein said assembly further comprises, for each of the corresponding walls of each of the structural profiles along which solar panels are slidably mounted, a stop element inserted in an opening of said corresponding wall between said solar panels and said lower end of said structural profile, said stop element comprising a groove extending along the length direction towards the lower end in which said corresponding wall can be introduced until reaching the end of said groove in a final secured position, in which, said stop element stops said slidably mounted solar panels in a final mounted position, wherein said method further comprises the steps of, for each of the corresponding walls of each of the structural profiles along which solar panels have been slidably mounted, inserting said stop element in an opening of said corresponding wall between said solar panels and said lower end of said structural profile;

positioning said stop element such that said groove extends along the length direction towards the lower end;

introducing said corresponding wall in said groove until reaching the end of said groove in a final secured position;

said stop element stopping said slidably mounted solar panels in a final mounted position.

14. The method of mounting said assembly according to claim 13, wherein said method further comprises the step of inserting at least one grounding element comprising a planar platform in between at least one of the slidably mounted solar panels when in their final mounted position and at least one of the corresponding panel supports on which the respective end of the respective solar panel rests.

* * * * *